(12) United States Patent
Uera et al.

(10) Patent No.: US 7,662,906 B2
(45) Date of Patent: Feb. 16, 2010

(54) POLYFUNCTIONAL PHENYLENE ETHER OLIGOMER, DERIVATIVE THEREOF, RESIN COMPOSITION CONTAINING THE SAME, AND USE THEREOF

(75) Inventors: Kazuyoshi Uera, Tokyo (JP); Takeru Horino, Tokyo (JP); Daisuke Ohno, Tokyo (JP); Kenji Ishii, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 219 days.

(21) Appl. No.: 11/704,211

(22) Filed: Feb. 9, 2007

(65) Prior Publication Data

US 2007/0213499 A1   Sep. 13, 2007

(30) Foreign Application Priority Data

| Mar. 10, 2006 | (JP) | ............................ 2006-065072 |
| Mar. 15, 2006 | (JP) | ............................ 2006-070983 |
| Apr. 20, 2006 | (JP) | ............................ 2006-116367 |

(51) Int. Cl.
  *C08G 63/78* (2006.01)
(52) U.S. Cl. ..................................................... 528/205
(58) Field of Classification Search ................ 528/205
  See application file for complete search history.

(56) References Cited

U.S. PATENT DOCUMENTS 4,116,936 A * 9/1978 Steiner ....................... 526/286

4,923,932 A * 5/1990 Katayose et al. ............ 525/391
2005/0090624 A1 * 4/2005 Norisue et al. .............. 525/392

* cited by examiner

*Primary Examiner*—Randy Gulakowski
*Assistant Examiner*—Shane Fang
(74) *Attorney, Agent, or Firm*—Wenderoth, Lind & Ponack, L.L.P.

(57) ABSTRACT

A polyfunctional phenylene ether oligomer (B) having 3 to less than 9 phenolic hydroxyl groups, obtained by reacting a polyfunctional phenol (A) having 3 to less than 9 phenolic hydroxyl groups per molecule and having alkyl groups and/or alkylene groups at 2- and 6-positions of at least one of the phenolic hydroxyl groups with a monohydric phenol compound of the formula (1), derivatives thereof, resin compositions containing the derivatives, curable films obtained therefrom and cured films thereof,

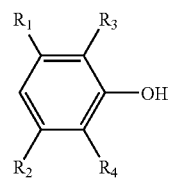

(1)

wherein $R_1$ and $R_2$ are the same or different and represent a hydrogen atom, a halogen atom, an alkyl group having 6 or less carbon atoms or a phenyl group, and $R_3$ and $R_4$ are the same or different and represent a halogen atom, an alkyl group having 6 or less carbon atoms or a phenyl group.

21 Claims, 8 Drawing Sheets

POLYFUNCTIONAL PHENYLENE ETHER OLIGOMER, DERIVATIVE THEREOF, RESIN COMPOSITION CONTAINING THE SAME, AND USE THEREOF

FIELD OF THE INVENTION

The present invention relates to a novel polyfunctional phenylene ether oligomer, derivatives thereof, resin compositions containing them and use thereof. More specifically, it relates to an epoxy resin obtained by glycidylating of a polyfunctional phenylene ether oligomer having excellent dielectric characteristics and heat resistance, an epoxy curable resin composition containing the epoxy resin, a cured product, a polyvinyl benzyl ether compound obtained by vinyl-benzylating of a polyfunctional phenylene ether oligomer having excellent dielectric characteristics, heat resistance and solvent solubility, an aromatic vinylic curable resin composition containing the polyvinyl benzyl ether compound, a cured product and use thereof.

BACKGROUND OF THE INVENTION

Epoxy resins are excellent in heat resistance, electrical characteristics, mechanical characteristics and adhesiveness so that the epoxy resins are used in wide fields such as fields of laminates, adhesives, coatings, molding materials and casting materials. In an electronic material field, in recent years, high frequency has come to be used in accordance with the progress of communication or computers, so that low dielectric characteristics are required for the purpose of increasing the speed of signal transmission. As methods for coping with the above requirement, a method which uses a dicyclopentadiene novolak type epoxy resin (for example, JP-A-11-060688) and a method which uses a biphenyl phenol aralkyl type epoxy resin (for example, JP-A-2002-179761) are known. In this respect, the present inventors have paid attention to polyphenylene ether resins which have properties of a low dielectric constant and a low dielectric loss tangent and developed a method in which an epoxy resin having a polyphenylene ether structure introduced therein is used (for example, JP-A-2003-292570). The epoxy resin having a polyphenylene ether structure introduced therein can have properties of high heat resistance, a low dielectric constant and a dielectric loss tangent, which polyphenylene ether resins have, but has a defect in that much time is required for curing, so that an improvement is required.

Conventionally, curable resins are widely used for adhesion, casting, coating, impregnation, lamination and molding compounds, etc. However, they are used in so various fields in recent years, and conventionally-known curable resins are sometimes dissatisfactory in some use environments or under some use conditions. For example, with regard to laminates for printed wiring boards used for various electrical devices, materials having low dielectric characteristics are required in accordance with the progress of electronic devices for the purpose of improving the speed of signal transmission. On the other hand, in recent years, materials are required to have higher heat resistance in addition to low dielectric characteristics under the influence of an increase of a reflow temperature due to the use of lead-free solder. Further, when used for electronic materials, curable resins are used in the form of varnishes in many cases. For this reason, it is required in view of workability that curable resins have excellent solvent solubility. As matrix resins which are recently used for laminates, phenol resins, epoxy resins, cyanate ester resins, vinyl ester resins and polyimide resins are known. These resins satisfy requirements such as high heat resistance and solvent solubility but do not sufficiently satisfy requirements of a low dielectric constant and a low dielectric loss tangent. As a curable resin which satisfies low dielectric characteristics, there are known a polyvinyl benzyl ether compound having a biphenyl phenol aralkyl structure introduced therein (for example, JP-A-2005-314556) and a bifunctional vinylbenzyl ether compound having a polyphenylene ether structure introduced therein, which the present inventors have developed, (for example, JP-A-2004-067727). However, further improvements in heat resistance and solvent solubility are required of these vinylbenzyl ether compounds. Development of a material having a balance of low dielectric characteristics, heat resistance and solvent solubility is desired.

Recently, the signal band of information communication devices such as PHS or portable telephones and the CPU clock time of computers reach to a GHz band and higher frequencies are coming to be used. The dielectric loss of electric signals is proportional to the product of the square root of dielectric constant of an insulator for forming a circuit, the dielectric loss tangent and the frequency of signals to be used. Therefore, the dielectric loss increases in accordance with an increase in the frequency of signals to be used. The dielectric loss damps electrical signals and impairs the reliability of the signals. For inhibiting the above impairment, it is required to select a material having a small dielectric constant and a small dielectric loss tangent as an insulator. As such a material, a fluorine-contained resin, a polyolefin resin, a polystyrene resin and a polyphenylene ether resin are proposed. However, though these resins are excellent in low dielectric characteristics, most of them have a problem about chemical resistance or moldability. With regard to films made of these resins for electrical insulating materials, for example, a film made of polyphenylene ether has a problem about flexibility (for example, JP-A-7-188362), and a film made of a low molecular weight styrene compound such as divinylbenzene is apt to have tackiness and a cured product obtained is fragile (for example, JP-A-2002-249531). The present inventors have proposed a resin composition having no tackiness and having low dielectric characteristics and high heat resistance by combining a vinyl compound derivative of a bifunctional polyphenylene ether oligomer with a high molecular weight compound (JP-A-2006-083364). However, since a solder reflow temperature is increased for coping with a recent demand for lead-free solder, materials which have further higher heat resistance and undergo only a small dimensional change under heat, are desired.

SUMMARY OF THE INVENTION

It is an object of the present invention to overcome the above-mentioned problems of the conventional technology and provide a polyfunctional epoxy resin which has excellent dielectric characteristics and heat resistance and also is improved in reactivity, a polyfunctional phenylene ether oligomer as a raw material for the above epoxy resin, an epoxy resin composition containing the above epoxy resin and a cured product thereof.

It is another object of the present invention to provide a polyvinyl benzyl ether compound improved in heat resistance and solubility, an aromatic vinylic resin composition containing the polyvinyl benzyl ether compound and a cured product thereof.

It is further another object of the present invention to provide an aromatic vinylic curable resin composition capable of providing a cured product which has high heat resistance, a low dielectric constant and a low dielectric loss tangent and undergoes only a slight dimensional change under heat, a curable film using the above resin composition and a film obtainable by curing the curable film.

The present invention 1 provides a polyfunctional phenylene ether oligomer (B) having 3 to less than 9 phenolic hydroxyl groups per molecule, which oligomer is obtained by reacting a polyfunctional phenol (A) having 3 to less than 9 phenolic hydroxyl groups per molecule and having alkyl groups and/or alkylene groups at 2- and 6-positions of at least one of the 3 to less than 9 phenolic hydroxyl groups with a monohydric phenol compound represented by the formula (1),

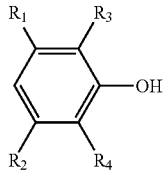
(1)

wherein $R_1$ and $R_2$ are the same or different and represent a hydrogen atom, a halogen atom, an alkyl group having 6 or less carbon atoms or a phenyl group, and $R_3$ and $R_4$ are the same or different and represent a halogen atom, an alkyl group having 6 or less carbon atoms or a phenyl group.

The present invention 1 further provides the polyfunctional phenylene ether oligomer (B), wherein the polyfunctional phenylene ether oligomer (B) has a number average molecular weight of 700 to 3,000 as polystyrene.

The present invention 1 still further provides the polyfunctional phenylene ether oligomer (B), wherein the monohydric phenol compound represented by the formula (1) is a compound of the formula (2), a compound of the formula (3) or a mixture of compounds of the formula (2) and the formula (3).

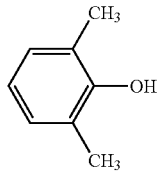
(2)

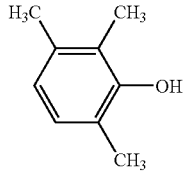
(3)

The present invention 1 furthermore provides a polyfunctional epoxy resin (E) obtained by glycidylating a phenolic hydroxyl group of the above polyfunctional phenylene ether oligomer (B), an epoxy resin composition containing the above polyfunctional epoxy resin, and a cured product obtained by curing the above resin composition.

The present invention 2 provides a polyvinyl benzyl ether compound (C) obtained by vinyl-benzylating a phenolic hydroxyl group of the polyfunctional phenylene ether oligomer (B).

The present invention 2 further provides an aromatic vinylic curable resin composition containing the polyvinyl benzyl ether compound (C), and a cured product obtained by curing the above resin composition.

The present invention 3 provides an aromatic vinylic curable resin composition containing a polyvinyl benzyl ether compound (C) obtained by vinyl benzyl etherification of a phenolic hydroxyl group of the above polyfunctional phenylene ether oligomer (B) and a styrenic thermoplastic elastomer (D).

The present invention 3 further provides the aromatic vinylic curable resin composition, wherein the styrenic thermoplastic elastomer (D) has a weight average molecular weight of 30,000 to 300,000 as polystyrene.

The present invention 3 still further provides the aromatic vinylic curable resin composition, wherein the styrenic thermoplastic elastomer (D) has a styrene content of 20 to 49% by weight.

The present invention 3 furthermore provides a curable film obtained by processing the above aromatic vinylic curable resin composition into a film form, and a film or conductor-layer-formed film obtained by curing the above curable film.

BRIEF DESCRIPTION OF DRAWINGS

In each of the following figures, a vertical axis shows the intensity of absorption and a horizontal axis shows ppm.

EFFECT OF THE INVENTION

Figure 1:
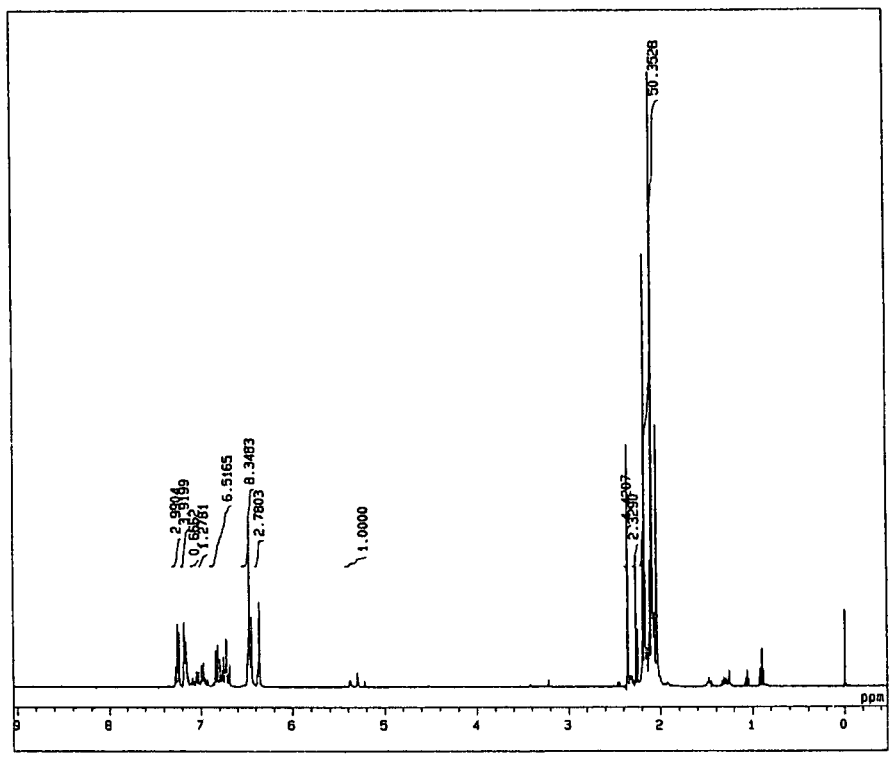
FIG. 1 shows $^1$H-NMR spectrum of a polyfunctional phenylene ether oligomer (a) obtained in Example 1.
Figure 2:
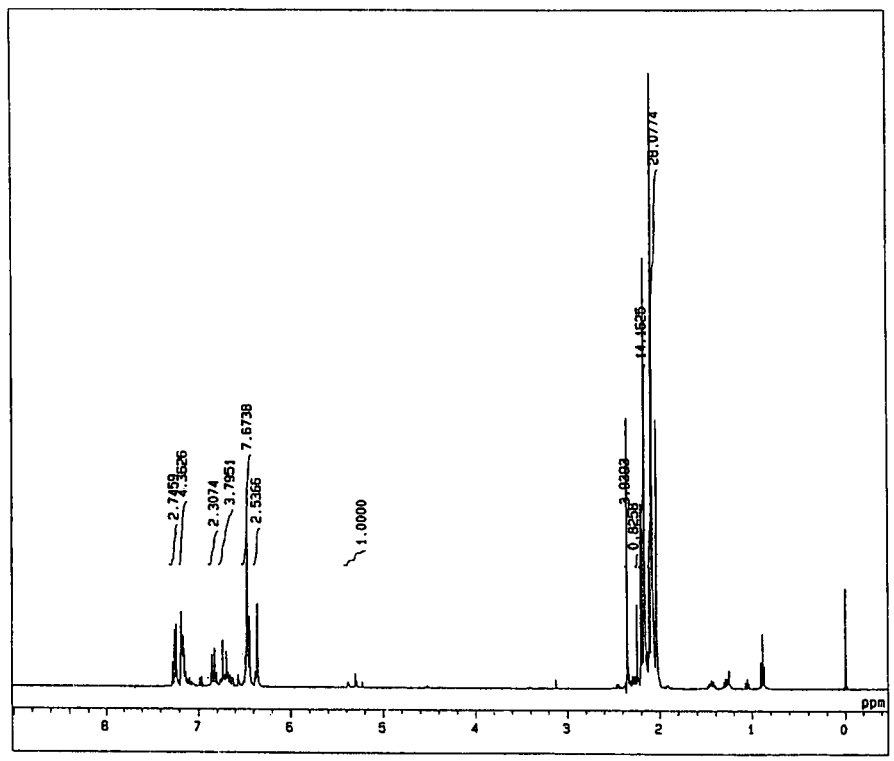
FIG. 2 shows $^1$H-NMR spectrum of a polyfunctional phenylene ether oligomer (c) obtained in Example 3.
Figure 3:
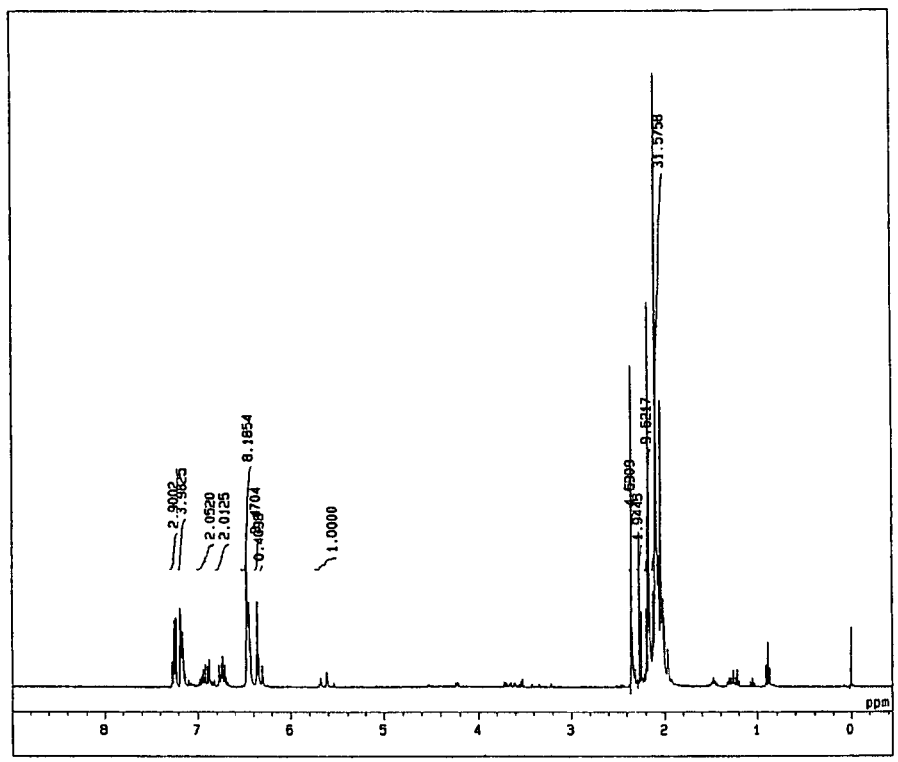
FIG. 3 shows $^1$H-NMR spectrum of a polyfunctional phenylene ether oligomer (d) obtained in Example 4.
Figure 4:
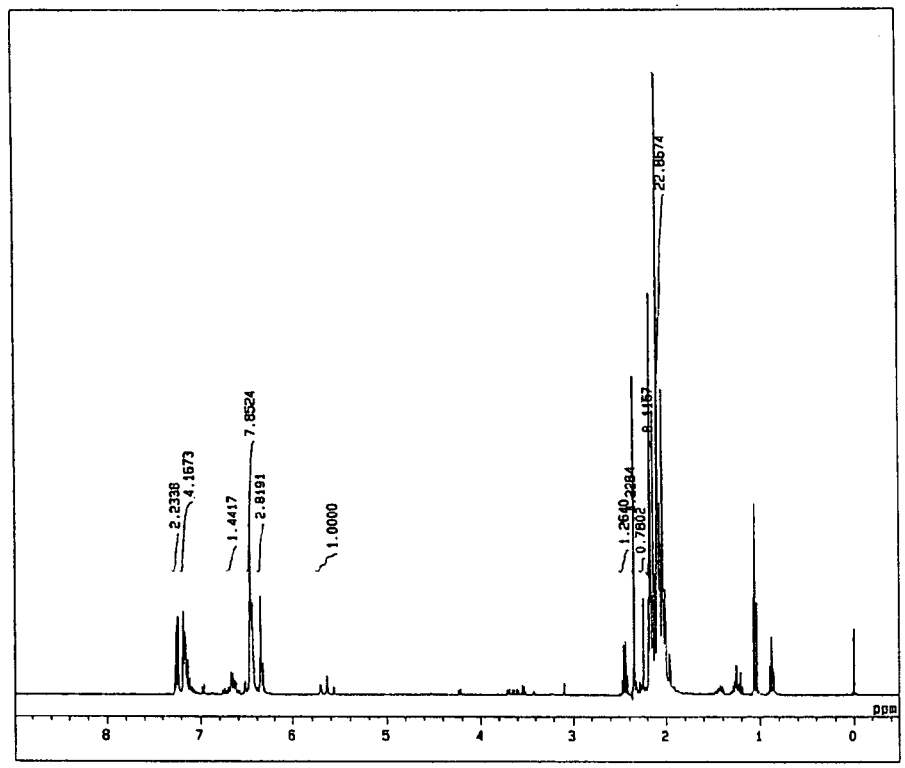
FIG. 4 shows $^1$H-NMR spectrum of a polyfunctional phenylene ether oligomer (e) obtained in Example 5.
Figure 5:
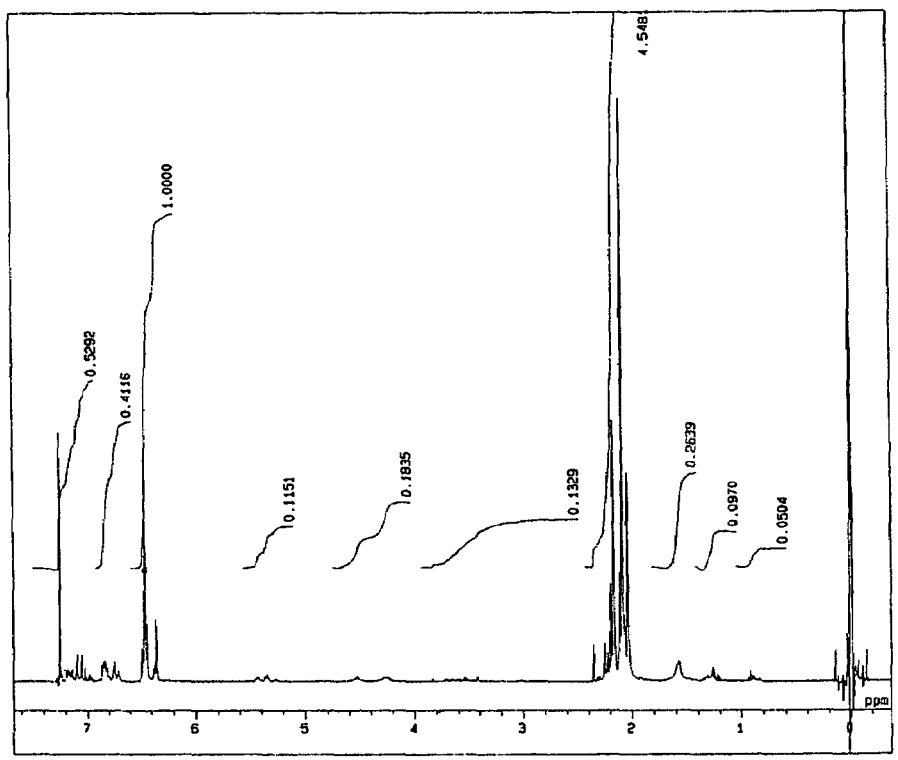
FIG. 5 shows $^1$H-NMR spectrum of a polyfunctional phenylene ether oligomer (f) obtained in Example 6.
Figure 6:
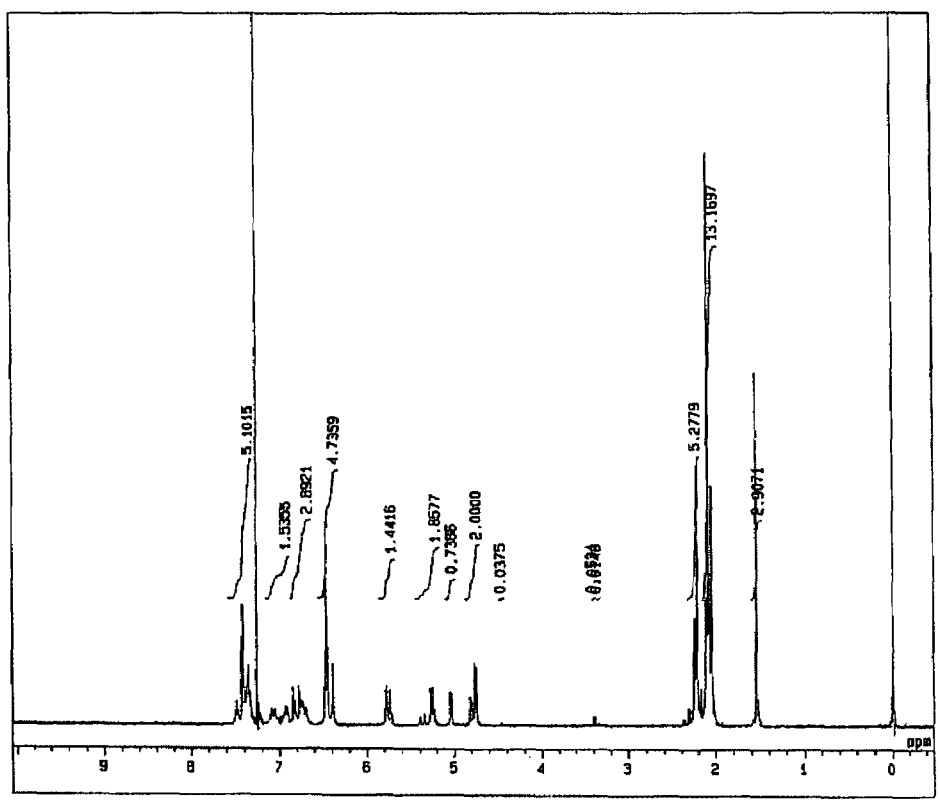
FIG. 6 shows $^1$H-NMR spectrum of a polyvinyl benzyl ether compound (h) obtained in Example 7.
Figure 7:
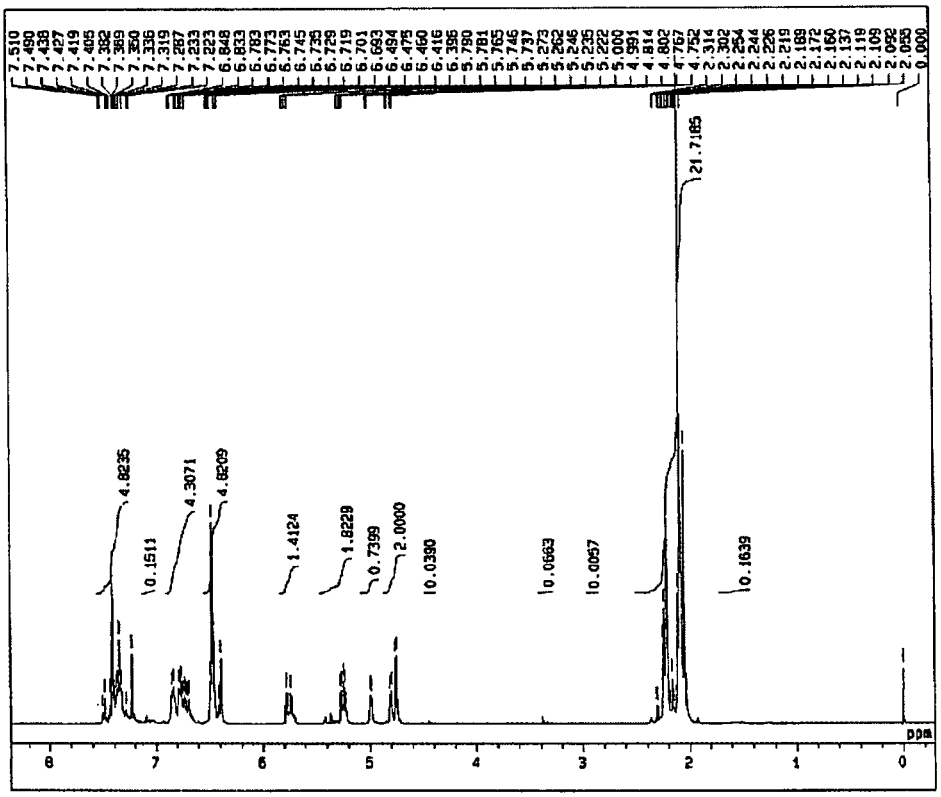
FIG. 7 shows $^1$H-NMR spectrum of a polyvinyl benzyl ether compound (j) obtained in Example 9.
Figure 8:
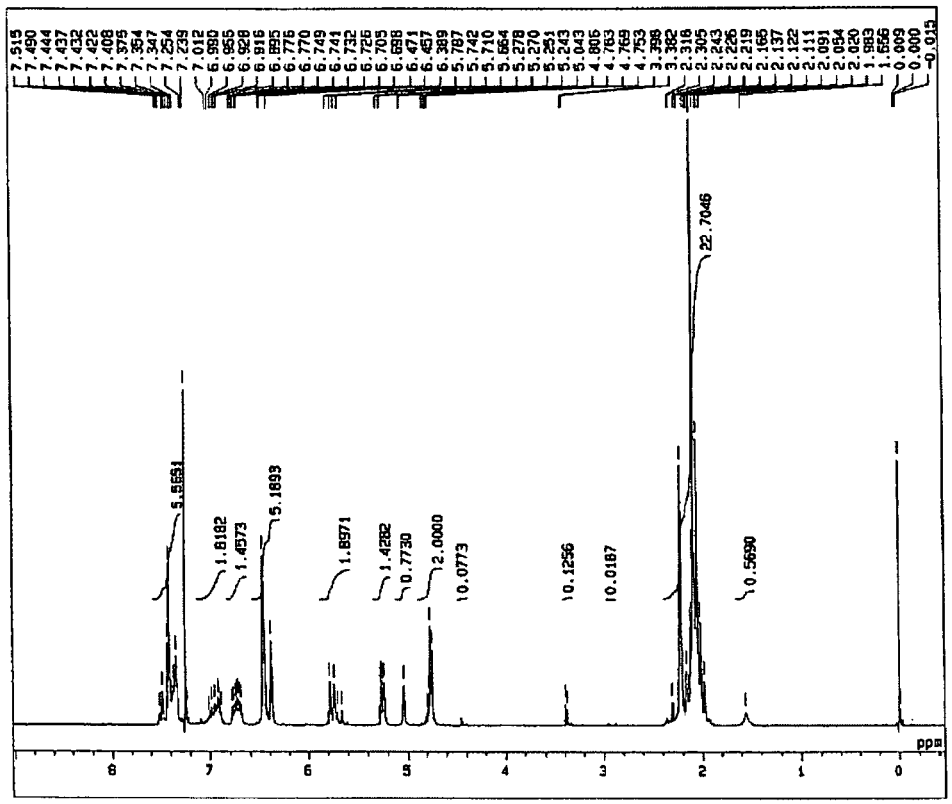
FIG. 8 shows $^1$H-NMR spectrum of a polyvinyl benzyl ether compound (k) obtained in Example 10.
Figure 9:
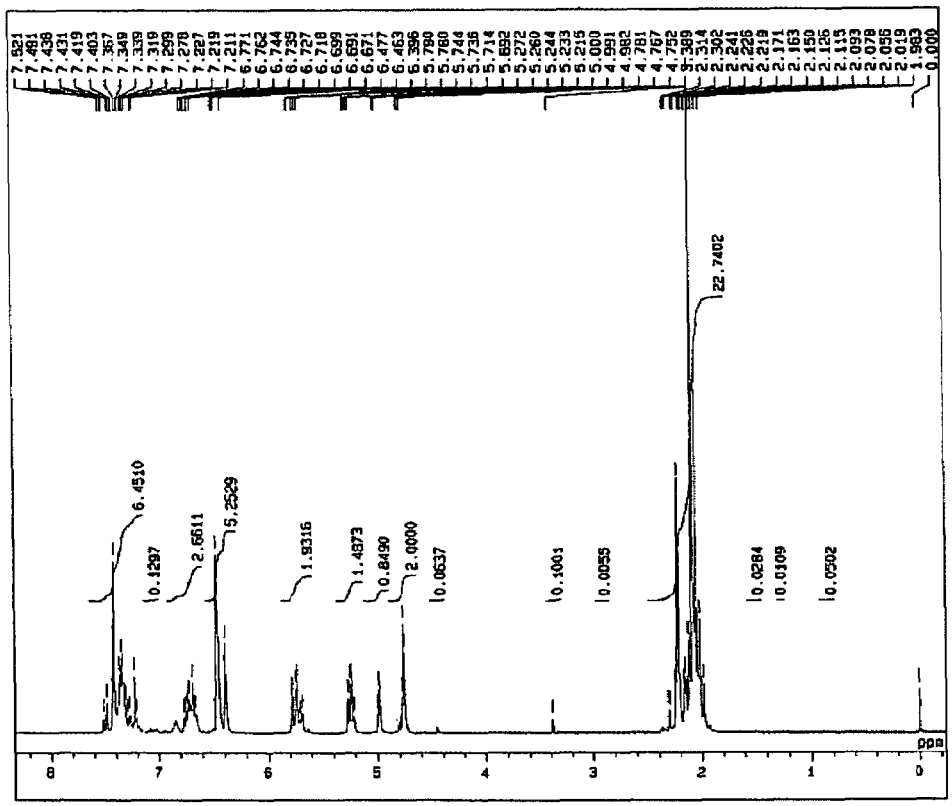
FIG. 9 shows $^1$H-NMR spectrum of a polyvinyl benzyl ether compound (l) obtained in Example 11.
Figure 10:
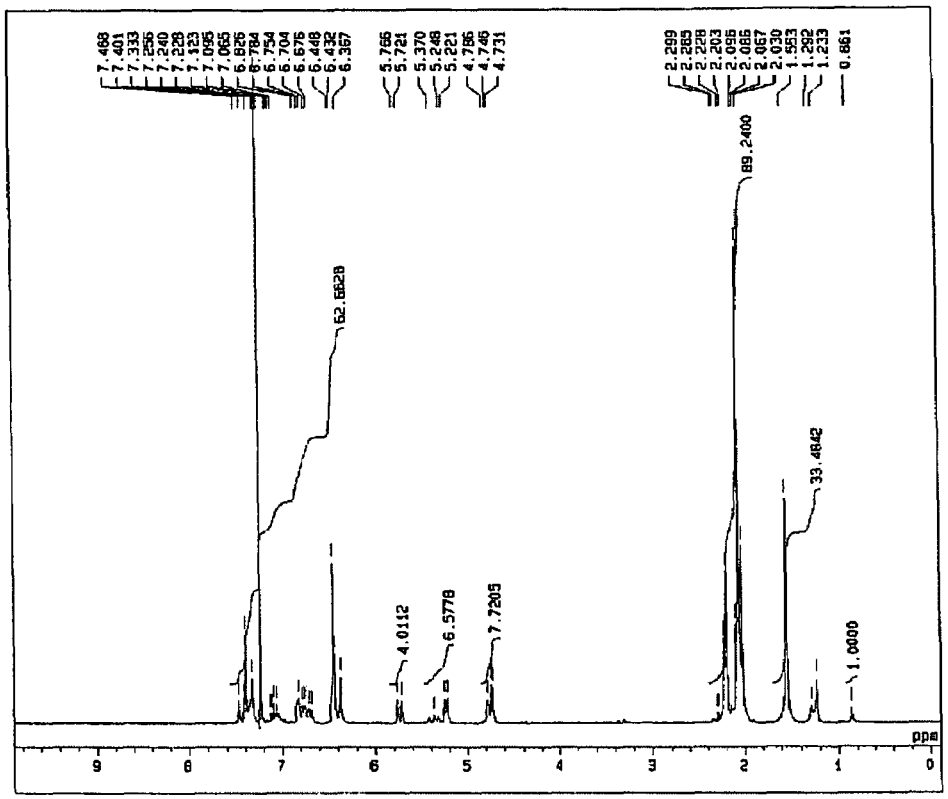
FIG. 10 shows $^1$H-NMR spectrum of a polyvinyl benzyl ether compound (m) obtained in Example 12.
Figure 11:
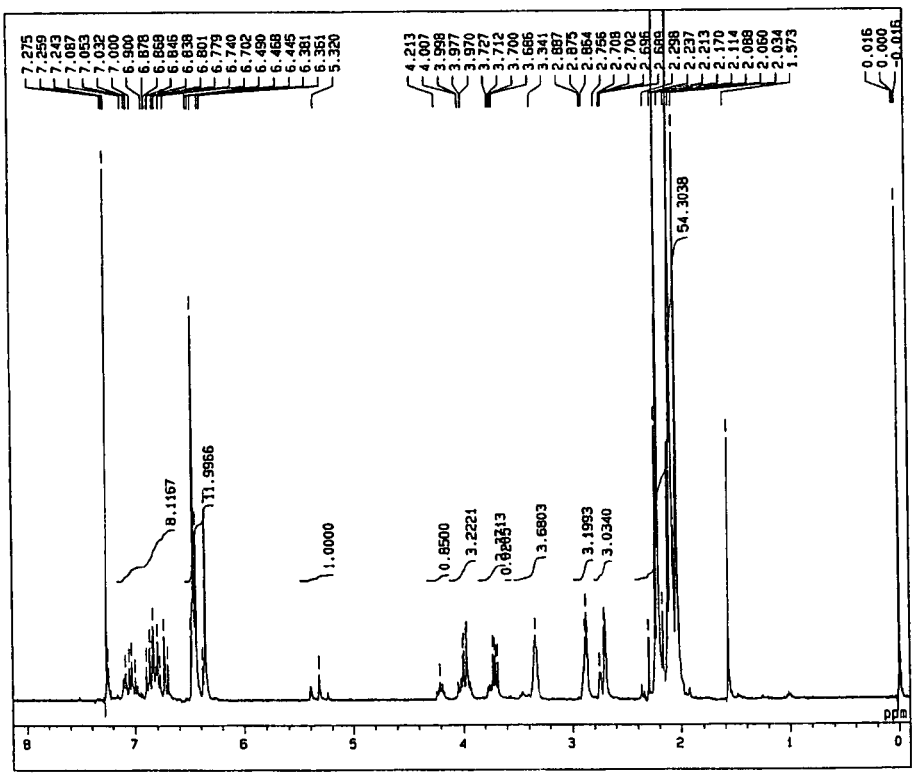
FIG. 11 shows $^1$H-NMR spectrum of a polyfunctional epoxy resin (p) obtained in Example 35.
Figure 12:
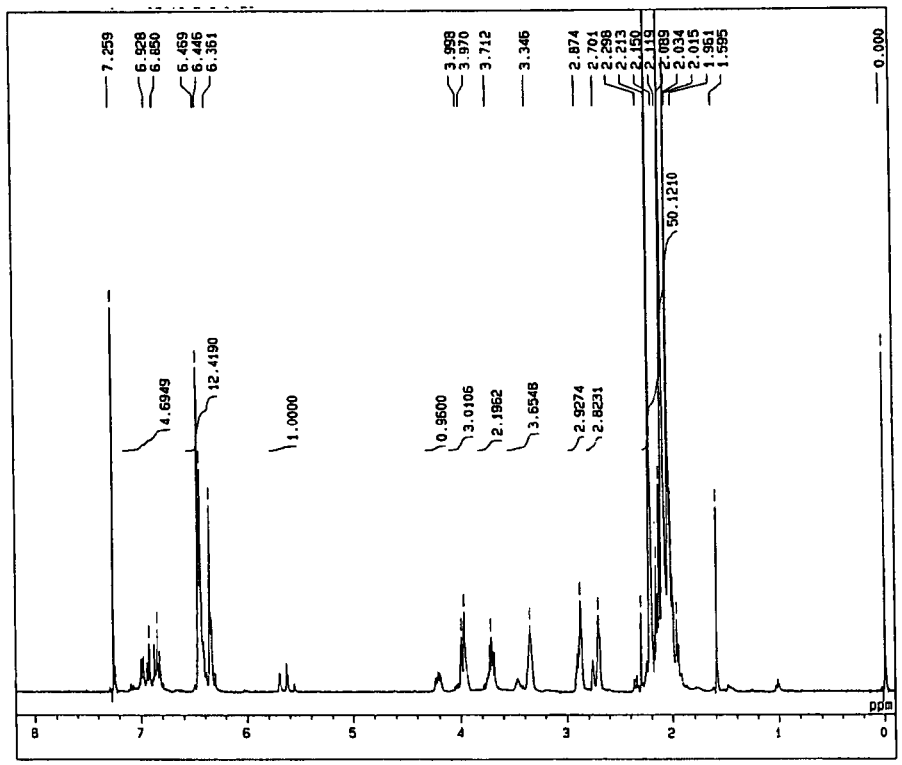
FIG. 12 shows $^1$H-NMR spectrum of a polyfunctional epoxy resin (r) obtained in Example 37.
Figure 13:
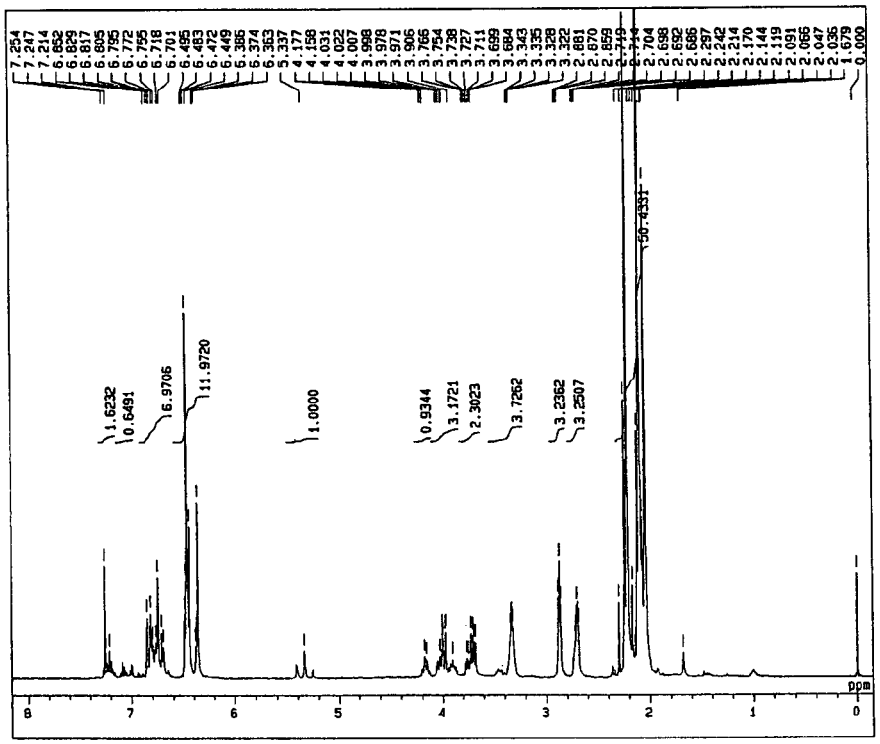
FIG. 13 shows $^1$H-NMR spectrum of a polyfunctional epoxy resin (s) obtained in Example 38.
Figure 14:
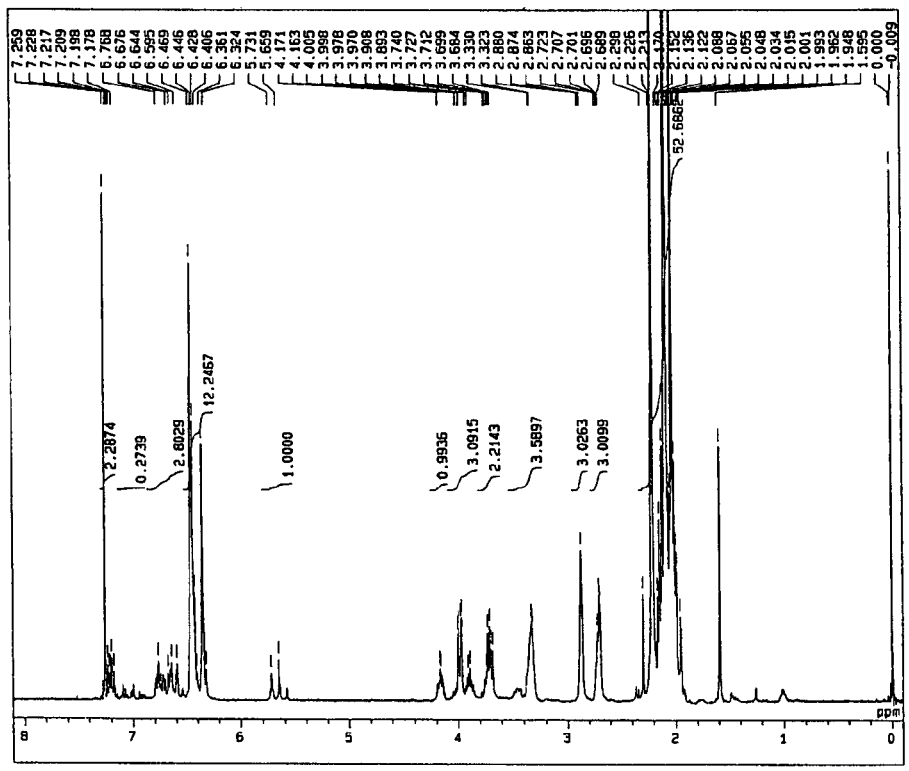
FIG. 14 shows $^1$H-NMR spectrum of a polyfunctional epoxy resin (t) obtained in Example 39.
Figure 15:
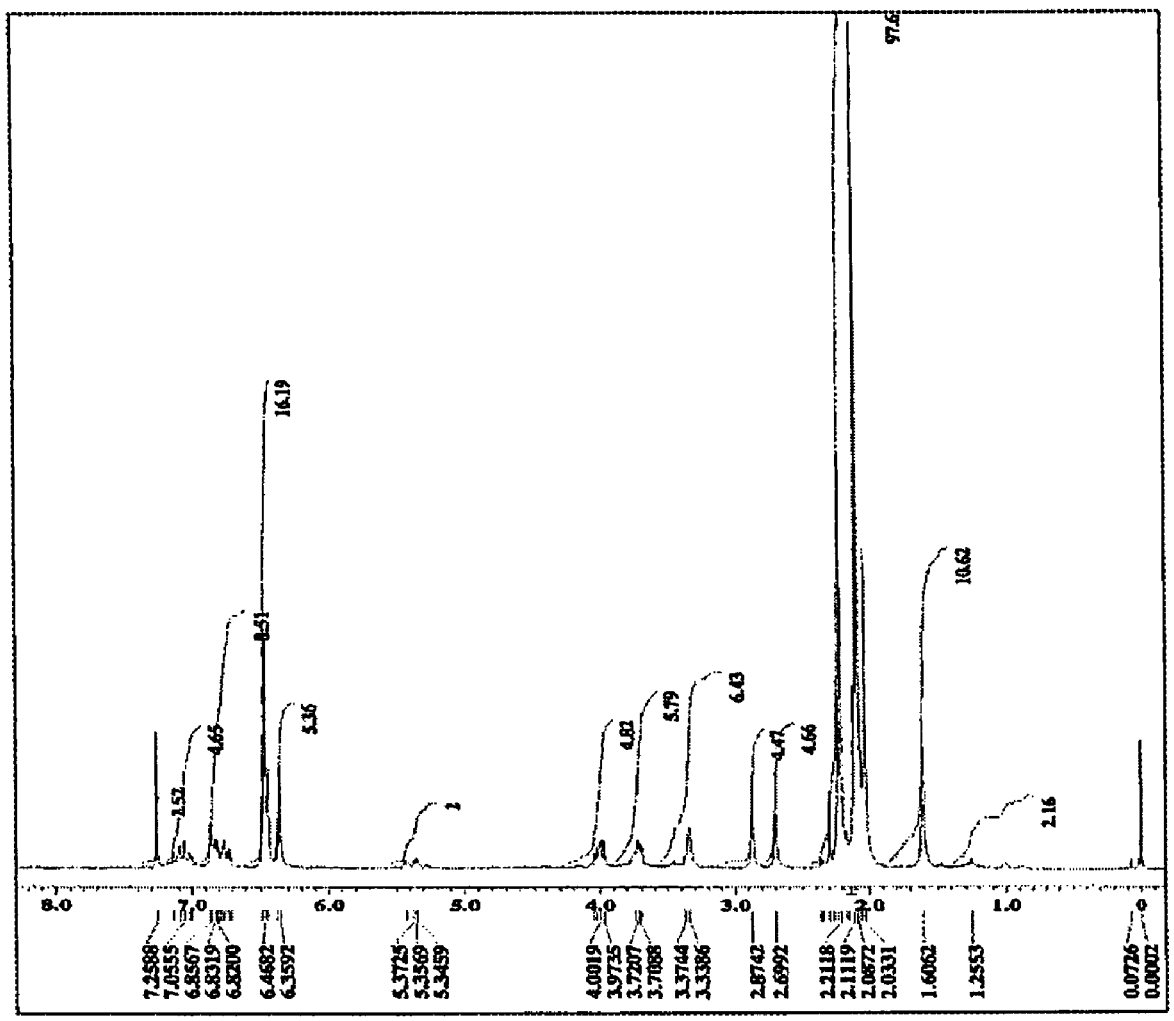
FIG 15 shows $^1$H-NMR spectrum of a polyfunctional epoxy resin (u) obtained in Example 40.

The epoxy curable resin composition containing the polyfunctional epoxy resin (E) obtained from the polyfunctional phenylene ether oligomer (B), provided by the present invention 1, is excellent in reactivity and its cured product has a low dielectric constant, a dielectric loss tangent and high heat resistance. Therefore, the epoxy curable resin composition is useful for insulating materials for electrical and electronic parts, various complex materials such as laminates or CFRP (carbon fiber reinforced plastic), adhesives and coatings.

The aromatic vinylic curable resin composition containing the polyvinylbenzyl ether compound (C), provided by the present invention 2, is excellent in reactivity and solvent solubility, and its cured product has a low dielectric constant, a dielectric loss tangent and high heat resistance. Therefore, the above aromatic vinylic curable resin composition is useful for insulating materials for electrical and electronic parts, various complex materials such as laminates (printed wiring boards) or CFRP (carbon fiber reinforced plastic), and molding raw materials.

By using the aromatic vinylic curable resin composition containing the polyvinylbenzyl ether compound (C) and the styrenic thermoplastic elastomer (D), provided by the present invention 3, a cured product which has high heat resistance, a low dielectric constant and a dielectric loss tangent and undergoes only a small dimensional change by heating can be obtained. Therefore, the aromatic vinylic curable resin composition is expected to be applied to insulating materials for electrical parts for high frequency, insulating materials for semiconductors, buildup wiring board materials, coating materials, coatings, adhesives and films for condensers. Industrial significance thereof is remarkably considerable.

DETAILED DESCRIPTION OF THE INVENTION

The present inventors have made diligent studies on epoxy resins for aiming at a thermosetting resin composition having excellent dielectric characteristics, excellent heat resistance and high reactivity and, as a result, found that a polyfunctional epoxy resin which is improved in reactivity and heat resistance with maintaining a low dielectric constant and a low dielectric loss tangent can be obtained by using a polyfunctional phenol compound having a specific structure as a raw material. On the basis of the finding, the present inventors have completed the present invention.

The polyfunctional phenylene ether oligomer (B) of the present invention is a polyfunctional phenylene ether oligomer (B) having 3 to less than 9 phenolic hydroxyl groups per molecule which can be obtained by reacting a polyfunctional phenol compound (A) with a monohydric phenol compound represented by the formula (1). The method for producing the polyfunctional phenylene ether oligomer (B) is not specially limited. For example, the polyfunctional phenylene ether oligomer (B) can be obtained by oxidatively polymerizing the polyfunctional phenol compound (A) with one monohydric phenol compound represented by the formula (1) or a mixture of at least two kinds of monohydric phenol compounds represented by the formula (1) in a solvent.

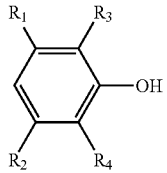
(1)

wherein $R_1$ and $R_2$ are the same or different and represent a hydrogen atom, a halogen atom, an alkyl group having 6 or less carbon atoms or a phenyl group, and $R_3$ and $R_4$ are the same or different and represent a halogen atom, an alkyl group having 6 or less carbon atoms or a phenyl group.

The polyfunctional phenol compound (A) used as a raw material for the polyfunctional phenylene ether oligomer (B) used in the present invention refers to a compound which has 3 to less than 9 phenolic hydroxyl groups per molecule and has alkyl groups and/or alkylene groups at 2- and 6-positions of at least one phenolic hydroxyl group, preferably 2 to less than 5 phenolic hydroxyl groups, of the 3 to less than 9 phenolic hydroxyl groups. The polyfunctional phenol compound (A) is preferably a compound represented by any one of the following formulae (4), (5), (6) and (7),

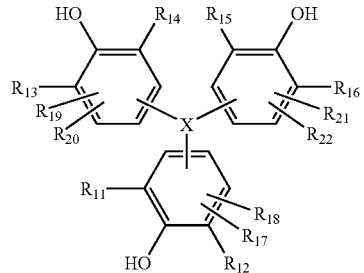
(4)

wherein X is a hydrocarbon having 1 to 20 carbon atoms, $R_{11}$ and $R_{12}$ are the same or different and represent an alkyl group having 6 or less carbon atoms, $R_{13}$, $R_{14}$, $R_{15}$ and $R_{16}$ are the same or different and represent a hydrogen atom, a halogen atom, an alkoxy group, an alkyl group having 6 or less carbon atoms or a phenyl group, and $R_{17}$, $R_{18}$, $R_{19}$, $R_{20}$, $R_{21}$ and $R_{22}$ are the same or different and represent a hydrogen atom, an alkoxy group, an alkyl group having 6 or less carbon atoms or a phenyl group,

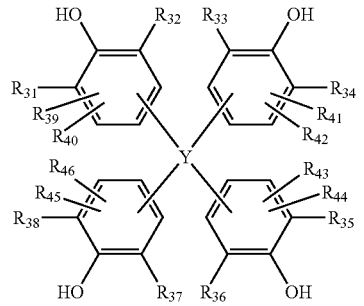
(5)

wherein Y is a hydrocarbon having 1 to 20 carbon atoms, $R_{31}$ and $R_{32}$ are the same or different and represent an alkyl group having 6 or less carbon atoms, $R_{33}$, $R_{34}$, $R_{35}$, $R_{36}$, $R_{37}$ and $R_{38}$ are the same or different and represent a hydrogen atom, a halogen atom, an alkoxy group, an alkyl group having 6 or less carbon atoms or a phenyl group, and $R_{39}$, $R_{40}$, $R_{41}$, $R_{42}$, $R_{43}$, $R_{44}$, $R_{45}$ and $R_{46}$ are the same or different and represent a hydrogen atom, an alkoxy group, an alkyl group having 6 or less carbon atoms or a phenyl group,

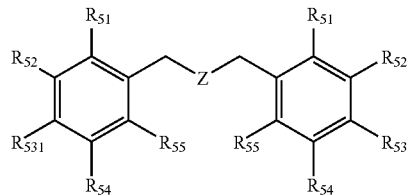
(6)

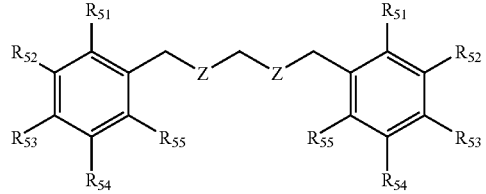
(7)

wherein Z is a phenylene group which has a hydroxyl group at least one position and may have substituent(s) at other positions, at least one of $R_{51}$, $R_{53}$ and $R_{55}$ represents a hydroxyl group and the others each represent a hydrogen atom, an alkoky group, an alkyl group having 6 or less carbon atoms or a phenyl group, and each of $R_{52}$ and $R_{54}$ represents a hydrogen atom, an alkyl group having 6 or less carbon atoms or a phenyl group, provided that two groups which are the same or different and are selected from the group consisting of an alkyl group and an alkylene group are present at 2- and 6-positions of at least one hydroxyl group in a molecule.

Examples of the compound of the formula (4) include 4,4'-[(3-hydroxyphenyl)methylene]bis(2,6-dimethylphenol), 4,4'-[(3-hydroxyphenyl)methylene]bis(2,3,6-trimethyl phenol), 4,4'-[(4-hydroxyphenyl)methylene]bis(2,6-dimethyl phenol), 4,4'-[(4-hydroxyphenyl)methylene]bis(2,3,6-trimethylphenol), 4,4'-[(4-hydroxy-3-ethoxyphenyl)methylene]bis(2,3,6-trimethylphenol), 4,4'-[4-(4-hydroxyphenyl)cyclohexylidene]bis(2,6-dimethylphenol), 4,4'-[1-[4-[1-(4-hydroxy-3,5-dimethylphenyl)-1-methylethyl]phenyl]ethylidene]bis(2,6-dimethylphenol) and 4,4'-[1-[4-[1-(4-hydroxy-3-fluorophenyl)-1-methylethyl]phenyl]ethylidene]bis(2,6-dimethylphenol).

Examples of the compound of the formula (5) include 4,4',4'',4'''-(1,2-ethanediylidene)tetrakis(2,6-dimethyl phenol) and 4,4',4'',4'''-(1,4-phenylenedimethylidene) tetrakis(2,6-dimethylphenol).

Examples of the compound of the formula (6) include 2,6-bis[(4-hydroxy-3,5-dimethylphenyl)methyl]-4-ethylphenol, 2,6-bis[(4-hydroxy-2,3,6-trimethylphenyl)methyl]-4-methylphenol, 2,6-bis[(4-hydroxy-3,5,6-trimethylphenyl)methyl]-4-ethylphenol, 2,4-bis[(4-hydroxy-3-methylphenyl)methyl]-6-methylphenol, 2,6-bis[(4-hydroxy-3-methylphenyl)methyl]-4-methylphenol, 2,4-bis[(4-hydroxy-3-cyclohexyl phenyl)methyl]-6-methylphenol, 2,4-bis[(4-hydroxy-3-methyl phenyl)methyl]-6-cyclohexylphenol, 2,4-bis[(2-hydroxy-5-methylphenyl)methyl]-6-cyclohexylphenol, 2,4-bis[(4-hydroxy-2,3,6-trimethylphenyl)methyl]-6-cyclohexylphenol, 3,6-bis[(4-hydroxy-3,5-dimethylphenyl)methyl]-1,2-benzenediol and 4,6-bis[(4-hydroxy-3,5-dimethylphenyl)methyl]-1,3-benzenediol.

Examples of the compound of the formula (7) include 2,2'-methylenebis[6-[((4/2-hydroxy-2,5/3,6-dimethylphenyl)methyl]-4-methylphenol], 2,2'-methylenebis[6-[(4-hydroxy-3,5-dimethylphenyl)methyl]-4-methylphenol], 2,2'-methylene bis[6-[(4/2-hydroxy-2,3,5/3,4,6-trimethylphenyl) methyl]-4-methylphenol], 2,2'-methylenebis[6-[(4-hydroxy-2,3,5-trimethylphenyl)methyl]-4-methylphenol], 4,4'-methylene bis[2-[(2,4-dihydroxyphenyl)methyl]-6-methylphenol], 4,4'-methylenebis[2-[(2,4-dihydroxyphenyl)methyl]-3,6-dimethylphenol], 4,4'-methylenebis[2-[(2,4-dihydroxy-3-methylphenyl)methyl]-3,6-dimethylphenol] and 6,6'-methylenebis[4-[(4-hydroxy-3,5-dimethylphenyl)methyl]-1,2,3-benzenetriol.

The polyfunctional phenol (A) is not limited to these examples. In addition to these compounds, examples of the polyfunctional phenol (A) include 4,4'-methylenebis [2-[(2,3,4-trihydroxyphenyl)methyl]-3,6-dimethylphenol], 4,4'-[(2-hydroxy-3-methoxyphenyl)methylene]bis(2,6-dimethyl phenol), 4,4'-[(2-hydroxyphenyl)methylene]-bis(2,3,6-trimethylphenol), 4,4'-[(3,4-dihydroxyphenyl)methylene]bis(2,6-dimethylphenol), 4,4'-[(3,4-dihydroxyphenyl)methylene]bis(2,3,6-trimethylphenol), 2,2'-[(4-hydroxy phenyl)methylene]bis(3,5,6-trimethylphenol), 2,4,6-tris [(4-hydroxy-3,5-dimethylphenyl)methyl]-1,3-benzenediol, 2,4,6-tris[(2-hydroxy-3,5-dimethylphenyl)methyl]-1,3-benzenediol, 4,4'-cyclohexylidenebis[2-cyclohexyl-6-[(2-hydroxy-5-methylphenyl)methyl]phenol], 4,4'-cyclohexylidenebis[2-cyclohexyl-6-[(4-hydroxy-3,5-dimethylphenyl)methyl]phenol], 4,4'-cyclohexylidenebis[2-cyclohexyl-6-[(4-hydroxy-2-methyl-5-cyclohexylphenyl)methyl]phenol] and 4,4'-cyclohexylidenebis[2-cyclohexyl-6-[(2,3,4-trihydroxyphenyl)methyl]phenol].

The number of the phenolic hydroxyl groups is not specially limited so long as it is 3 or more. When the number of the phenolic hydroxyl groups is too large, the dielectric characteristics of a cured product are impaired in some cases. Therefore, it is preferably 3 to 4. More preferably, the polyfunctional phenol (A) is a polyfunctional phenol compound having 3 to 4 hydroxyl groups, represented by the formula (4) or the formula (5).

Further, a methyl group is preferred as the alkyl groups and/or alkylene groups of the 2- and 6-positions. The polyfunctional phenol compound (A) is most preferably 4,4'-[(3-hydroxyphenyl)methylene]bis(2,6-dimethylphenol), 4,4'-[(3-hydroxyphenyl)methylene]bis(2,3,6-trimethyl phenol), 4,4'-[(4-hydroxyphenyl)methylene]bis(2,6-dimethyl phenol), 4,4'-[(4-hydroxyphenyl)methylene]bis(2,3,6-trimethylphenol) or 4,4',4'',4'''-(1,4-phenylene dimethylidene)tetrakis(2,6-dimethylphenol).

The monohydric phenol compound used as a raw material for the polyfunctional phenylene ether oligomer (B) of the present invention refers to a monohydric phenol compound represented by the formula (1) wherein $R_1$ and $R_2$ are the same or different and represent a hydrogen atom, a halogen atom, an alkyl group having 6 or less carbon atoms or a phenyl group, and $R_3$ and $R_4$ are the same or different and represent a halogen atom, an alkyl group having 6 or less carbon atoms or a phenyl group. As the monohydric phenol compound of the formula (1), it is particularly preferred to use a compound having substituents at 2- and 6-positions or a compound having substituents at 2-, 3- and 6-positions or jointly use a compound having substituents at 2- and 6-positions and a compound having substituents at 2-, 3- and 6-positions. Further, the monohydric phenol compound is further preferably 2,6-dimethylphenol, 2,3,6-trimetylphenol or a mixture of 2,6-dimethylphenol and 2,3,6-trimetylphenol.

The polyfunctional phenylene ether oligomer (B) used in the present invention refers to a polyfunctional phenylene ether oligomer having 3 to less than 9 phenolic hydroxyl groups in a molecule, which oligomer is obtained by reacting the polyfunctional phenol compound (A) with the monohydric phenol compound represented by the formula (1). The method for producing the polyfunctional phenylene ether oligomer (B) is not specially limited. For example, the polyfunctional phenylene ether oligomer (B) can be obtained in accordance with methods disclosed by JP-A-2004-307554 and JP-A-2005-023201. Oxidation polymerization of the polyfunctional phenol (A) and the monohydric phenol compound of the formula (1), which is a preferable embodiment of the method of producing the polyfunctional phenylene ether oligomer (B) in the present invention, is typically carried out by a method which uses an oxygen gas or air directly. Further, an electrode oxidation method is also adaptable. The oxidation method is not specially limited. Air oxidation is preferable in view of safety and economical plant and equipment investment.

A catalyst may be used for the oxidation polymerization using an oxygen gas or air. Examples of the catalyst include copper salts such as CuCl, CuBr, $Cu_2SO_4$, $CUCl_2$, $CuBr_2$, $CuSO_4$ and CuI. These copper salts may be used alone or in combination. In addition to the above catalysts, an amine can be used. Examples of the amine include mono and dimethyl amines, mono and diethyl amines, mono and dipropyl amines, mono- and di-n-butyl amines, mono- and di-secdipropyl amines, mono and dibenzyl amines, mono and dicyclohexyl amines, mono and diethanol amines, ethyl methyl amine, methyl propyl amine, butyl dimethyl amine, allyl ethyl amine, methyl cyclohexyl amine, morpholine, methyl-n-butylamine, ethyl isopropyl amine, benzyl methyl amine, octyl benzyl amine, octyl chlorobenzyl amine, methyl(phenylethyl)amine, benzyl ethyl amine, N-n-butyldimethyl amine, N,N'-di-tert-butylethylenediamine, di(chlorophenylethyl)amine, 1-methylamino-4-pentene, pyridine, methylpyridine, 4-dimethylaminopyridine and piperidine. These amines may be used alone or in combination. The catalyst is not specially limited to these examples so long as it is a copper salt or an amine.

The reaction solvent for the oxidation polymerization can be selected from aromatic hydrocarbon solvents such as toluene, benzene and xylene and halogenated hydrocarbon solvents such as methylene chloride, chloroform and carbon tetrachloride. An alcohol solvent or a ketone solvent can be used in combination with the aromatic hydrocarbon solvents or the halogenated hydrocarbon solvents. The alcohol solvent includes methanol, ethanol, butanol, propanol, methyl propylene diglycol, diethylene glycol ethyl ether, butyl propylene glycol and propyl propylene glycol. The ketone solvent includes acetone, methyl ethyl ketone, diethyl ketone, methyl butyl ketone, and methyl isobutyl ketone. Tetrahydrofuran or dioxane can be also used. The reaction solvent is not limited to these solvents.

The reaction temperature for the oxidation polymerization is not specially limited. The reaction temperature is preferably 25 to 50° C. Since the oxidation polymerization is an exothermic reaction, it is difficult to control the temperature at 50° C. or higher and it is difficult to control a molecular weight. When the reaction temperature is 25° C. or lower, the speed of the reaction becomes extremely slow so that efficient production is impossible.

The number average molecular weight of the polyfunctional phenylene ether oligomer (B) of the present invention is preferably in the range of from 700 to 3,000. When the number average molecular weight is larger than 3,000, the melt viscosity of a reaction mixture increases during glycidylating so that the reactivity descends. When the number average molecular weight is less than 700, the polyfunctional epoxy resin obtained is poor in low dielectric characteristics and heat resistance.

The polyfunctional epoxy resin (E) of the present invention 1 can be obtained by glycidylating a phenolic hydroxyl group of the above polyfunctional phenylene ether oligomer (B). The polyfunctional epoxy resin (E) of the present invention 1 preferably has an epoxy equivalent in the range of from 250 to 1,000 g/eq. The method for producing the polyfunctional epoxy resin (E) is not specially limited. For example, it can be synthesized by dehydrohalogenation of the polyfunctional phenylene ether oligomer (B) in the presence of a halogenated glycidyl such as epichlorohydrin and a base. The polyfunctional phenylene ether oligomer (B) can be used in the form of a powder, which is separated from a reaction solution, or in the form of a solution in which the oligomer (B) is dissolved in a reaction solution. Typical examples of the base include sodium hydroxide, potassium hydroxide, sodium methoxide, sodium ethoxide, calcium hydroxide, sodium carbonate, potassium carbonate and sodium bicarbonate. The base is not limited to these bases. The reaction temperature is preferably between −10° C. and 110° C. When the reaction temperature is less than −10° C., the glycidylating reaction is slow. When it is higher than 110° C., a side reaction is apt to occur such as a reaction of the halogenated glycidyl such as epichlorohydrin with the base.

The epoxy resin composition of the present invention 1 contains the polyfunctional epoxy resin (E). A preferred embodiment thereof is an epoxy curable resin composition containing the polyfunctional epoxy resin (E) and a curing agent for epoxy resins. The curing agent can be selected from various curing agents and is not specially limited. Examples thereof includes an amine compound, an acid anhydride compound, an amide compound and a phenol compound. Further, concrete examples thereof include diaminodiphenylmethane, diethylene triamine, triethylene tetramine, diaminodiphenyl sulfone, isophorone diamine, dicyan diamide, a polyamide resin synthesized from a dimer of linolenic acid and ethylene diamine, phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, methylhexahydrophthalic anhydride, polyfunctional phenol compounds and modified compounds thereof such as a phenol novolak resin, a cresol novolak resin, an aromatic hydrocarbon formaldehyde resin modified phenol resin, a dicyclopentadiene phenol addition type resin, a phenol aralkyl resin, a naphthol aralkyl resin, a trimethylolmethane resin, a tetraphenylolethane resin, a naphthol novolak resin, a naphthol-phenol co-condensation novolak resin, a naphthol-cresol co-condensation novolak resin, a biphenyl modified phenol resin, and an aminotriazine modified phenol resin, imidazoles, $BF_3$-amine complex, and a guanidine derivative. These curing agents can be used alone or in combination.

The epoxy resin composition of the present invention 1 can further contain a curing accelerator for epoxy resins. Examples of the curing accelerator include imidazoles such as 2-methylimidazole, 2-ethylimidazole, 2-phenylimidazole and 2-ethyl-4-methylimidazole, tertiary amines such as 2-(dimethylaminomethyl)phenol, triethylenediamine, triethanolamine and 1,8-diazabicyclo(5,4,0)undecene-7, organic phosphines such as triphenylphosphine, diphenylphosphine and tributylphosphine, metal compounds such as tin octylate, tetra-substituted phosphonium.tetra-substituted borate such as tetraphenyl phosphonium.tetraphenyl borate and tetraphenyl phosphonium.ethyltriphenyl borate, and tetraphenyl boron salts such as 2-ethyl-4-methylimidazole.tetraphenyl borate and N-methylmorpholine.tetraphenyl borate.

The polyfunctional epoxy resin (E) of the present invention 1 has a low melt viscosity and good fluidity and is excellent in compatibility with a different resin. The polyfunctional epoxy resin (E) can be used in combination with a variety of resins according to an intended purpose and intended usage. Specific examples thereof include various different epoxy resins; modified epoxy resins; oxetane resins; (meth)acrylic esters; polyallyl compounds such as diallylbenzene and diallylterephthalate; vinyl compounds such as N-vinyl-2-pyrrolidone and divinylbenzene; polymerizable double-bond-containing monomers such as unsaturated polyester; polyfunctional maleimides; polyimides; rubbers such as polybutadiene; thermoplastic resins such as polyethylene and polystyrene; engineering plastics such as ABS resin and polycarbonate; and cyanate ester resin. The resins, which can be used in combination with the polyfunctional epoxy resin (E), are not limited to these examples.

Further, the epoxy resin composition of the present invention 1 can further contain a variety of known additives such as an inorganic or organic filler, a dye, a pigment, a thickener, a lubricant, a defoaming agent, a coupling agent, a photosensitizer, an ultraviolet absorber and a flame retardant, as required.

The epoxy resin composition of the present invention 1 undergoes sufficient curing reaction by homogeneously mixing the above respective components in a predetermined ratio as required, carrying out preliminary-curing at a temperature of 100° C. to 200° C. as required, and carrying out post-curing at a temperature of 150° C. to 200° C. for 1 to 15 hours, whereby an epoxy cured product of the present invention 1 can be obtained. Further, curing can be carried out after homogeneously dispersing or dissolving the epoxy resin composition in a solvent or the like and removing the solvent.

The thus-obtained epoxy cured product of the present invention 1 has heat-resistance, a low dielectric constant and a low dielectric loss tangent. Therefore, the resin composition of the present invention can be used in various fields that need heat-resistance, a low dielectric constant and a low dielectric loss tangent. Specifically, the resin composition of the present invention is useful as a material for electrical and electronic parts such as an insulating material, a laminate or a sealing material.

The present inventors have made diligent studies on polyvinylbenzyl ether compounds for aiming at a curable resin composition excellent in dielectric characteristics, heat resistance and solvent solubility and as a result found a polyvinylbenzyl ether compound which can be improved in heat resistance and solvent solubility with maintaining a low dielectric constant and a dielectric loss tangent. On the basis of the above finding, the present inventors have completed the present invention. That is, the polyvinylbenzyl ether compound of the present invention 2 is a polyvinylbenzyl ether compound (C) obtained by vinyl-benzylating a phenolic hydroxyl group of a polyfunctional phenylene ether oligomer (B) having 3 to less than 9 phenolic hydroxyl groups, the polyfunctional phenylene ether oligomer (B) being obtained by reacting a polyfunctional phenol (A) with a monohydric phenol compound represented by the formula (1),

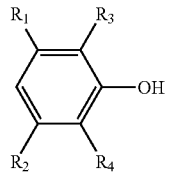

(1)

wherein $R_1$ and $R_2$ are the same or different and represent a hydrogen atom, a halogen atom, an alkyl group having 6 or less carbon atoms or a phenyl group, and $R_3$ and $R_4$ are the same or different and represent a halogen atom, an alkyl group having 6 or less carbon atoms or a phenyl group.

The number average molecular weight of the polyfunctional phenylene ether oligomer (B) used in the present invention 2 is preferably in the range of from 700 to 3,000. When the number average molecular weight is larger than 3,000, a melt viscosity of a reaction mixture increases during vinylbenzylating of the polyfunctional phenylene ether oligomer so that reactivity decreases. When the number average molecular weight is less than 700, a polyvinyl benzyl ether compound obtained is likely to become tacky so that a handling problem occurs.

The polyvinylbenzyl ether compound (C) of the present invention 2 can be obtained by vinylbenzyl etherification of a phenolic hydroxyl group of the polyfunctional phenylene ether oligomer (B). The method for producing the polyvinylbenzyl ether compound is not specially limited. For example, the polyvinylbenzyl ether compound can be synthesized by dehydrohalogenation of the polyfunctional phenylene ether oligomer (B) in the presence of vinylbenzyl halide and a base.

The polyfunctional phenylene ether oligomer (B) can be used in the form of a powder separated from a reaction solution or in the form of a solution in which the oligomer (B) is dissolved in a reaction solution. The vinylbenzyl halide includes p-vinylbenzyl chloride, m-vinylbenzyl chloride, O-vinylbenzyl chloride, p-vinylbenzyl bromide, m-vinylbenzyl bromide and o-vinylbenzyl bromide. These can be used alone or in combination. Typical examples of the base include sodium hydroxide, potassium hydroxide, sodium methoxide, sodium ethoxide, calcium hydroxide, sodium carbonate, potassium carbonate or sodium bicarbonate. The base is not limited to these examples. The reaction temperature is preferably between −10° C. and 110° C. When the reaction temperature is less than −10° C., addition reaction is slow. When it is higher than 110° C., a side reaction is apt to occur such as a reaction of the vinylbenzyl halide with the base.

The aromatic vinylic curable resin composition of the present invention 2 will be explained hereinafter. The aromatic vinylic curable resin composition of the present invention 2 contains the polyvinylbenzyl ether compound of the present invention 2. A compound which is copolymerizable with the above polyvinylbenzyl ether compound can be jointly used.

In the aromatic vinylic curable resin composition of the present invention 2, the compound which is jointly used with and copolymerizable with the polyvinylbenzyl ether compound refers to a compound having a double bond in its molecule. Examples thereof include styrene, vinyl toluene, divinylbenzene, divinylbenzyl ether, allyl phenol, allyloxybenzene, diallyl phthalate, acrylic ester, methacrylic ester and vinyl pyrrolidone. The above copolymerizable compound is not limited to these compounds. These copolymerizable compounds may be used alone or in combination.

Further, the resin composition of the present invention 2 can be used in combination with a variety of resins according to an intended purpose and intended usage. Specific examples thereof include known thermosetting resins such as a vinyl ester resin, an unsaturated polyester resin, a maleimide resin, a cyanate ester resin, an epoxy resin, a phenol aralkyl resin and a different vinylbenzyl compound and known thermoplastic resins such as polyether imide, polyether sulfone, polyacetal and a dicyclopentadiene-containing resin. Of these, the vinyl ester resin and the epoxy resin are preferred. These resins can be used alone or in combination.

The aromatic vinylic curable resin composition of the present invention 2 can further contain a curing agent. Examples of the curing agent to be used include known radical polymerization initiators such as benzoyl peroxide, methyl ethyl ketone peroxide, dicumyl peroxide, tert-butylperbenzoate, 2,5-dimethyl-2,5-di(tert-butylperoxy)hexane, 2,5-dimethyl-2,5-bis(tert-butylperoxy)hexyne-3 and di-tert-butylperoxide.

Further, a known polymerization inhibitor such as hydroquinone, benzoquinone or copper salts can be incorporated for the purpose of adjusting a cure extent.

Further, a curing accelerator can be used in combination with the above curing agent. Examples of the curing accelerator include imidazoles such as 2-methylimidazole, 2-ethylimidazole, 2-phenylimidazole and 2-ethyl-4-methylimidazole, tertiary amines such as 2-(dimethylaminomethyl)phenol, triethylenediamine, triethanolamine and 1,8-diazabicyclo(5,4,0)undecene-7, organic phosphines such as triphenylphosphine, diphenylphosphine and tributylphosphine, metal compounds such as tin octylate, tetra-substituted phosphonium tetra-substituted borate such as tetraphenyl phosphonium tetraphenyl borate and tetraphenyl phosphonium.ethyltriphenyl borate, and tetraphenyl boron salts such as 2-ethyl-4-methylimidazole tetraphenyl borate and N-methylmorpholine.tetraphenyl borate.

Further, the aromatic vinylic curable resin composition of the present invention 2 can further contain a variety of extenders such as an inorganic filler, a silane-coupling agent, a stabilizer, a releasing agent and a pigment, a variety of other thermosetting resins and thermoplastic resins, and a reinforced fiber, as required.

The aromatic vinylic curable resin composition of the present invention 2 undergoes sufficient curing reaction by homogeneously mixing the above respective components in a predetermined ratio as required, and carrying out post-curing at a temperature of 150° C. to 250° C. for 1 to 15 hours, whereby an aromatic vinylic cured product can be obtained.

The thus-obtained aromatic vinylic cured product has heat resistance, a low dielectric constant and a low dielectric loss tangent. Therefore, the resin composition of the present invention can be used in wide fields that need heat-resistance, a low dielectric constant and a low dielectric loss tangent. Specifically, the resin composition of the present invention is useful as a material for various electrical and electric parts such as an insulating material or a laminate.

The present inventors have found that a cured product which has high heat resistance, a low dielectric constant and a dielectric loss tangent and undergoes only a slight dimensional change under heat can be obtained by combining a polyvinylbenzyl ether compound (C) having a polyphenylene ether structure and 3 to less than 9 vinylbenzyl groups in a molecule with a styrenic thermoplastic elastomer (D). On the basis of the above finding, the present inventors have completed the present invention 3. That is, the present invention 3 relates to an aromatic vinylic curable resin composition containing the polyvinylbenzyl ether compound (C) obtained by the present invention 2 and a styrenic thermoplastic elastomer (D). Further, the present invention 3 relates to a curable film obtained by processing the above curable resin composition into a film form, and a film or conductor-layer-formed film obtained by curing the above curable film.

The content of the polyvinylbenzyl ether compound (C) in the aromatic vinylic curable resin composition of the present invention 3 is not specially limited. However, when the above content is too small, intended low dielectric characteristics, heat resistance and curability cannot be obtained. Therefore, the content of the polyvinylbenzyl ether compound (C) in the curable resin composition is preferably 5 wt % to 95 wt %, more preferably 20 wt % to 85 wt %, further preferably 30 wt % to 70 wt %.

It is desirable that the styrenic thermoplastic elastomer (D) used in the aromatic vinylic curable resin composition of the present invention 3 is capable of imparting a film-forming ability without impairing the low dielectric characteristics and heat resistance of the polyvinylbenzyl ether compound (C). Specific examples of such a styrenic thermoplastic elastomer (D) include a styrene butadiene copolymer (SBR), a styrene isoprene copolymer (SIR), a styrene butadiene styrene copolymer (SBS), a hydrogenated styrene butadiene styrene copolymer, a styrene isoprene styrene copolymer (SIS), a hydrogenated styrene isoprene styrene copolymer and a hydrogenated styrene (butadiene/isoprene) styrene copolymer. These styrenic thermoplastic elastomers (D) can be used alone or in combination. Of these, the styrene butadiene styrene copolymer (SBS), the hydrogenated styrene butadiene styrene copolymer, the styrene isoprene styrene copolymer (SIS), the hydrogenated styrene isoprene styrene copolymer and the hydrogenated styrene (butadiene/isoprene) styrene copolymer are preferred since these copolymers have good compatibility with the polyvinylbenzyl ether compound (C).

The styrene content in the styrenic thermoplastic elastomer (D) is not specially limited. The styrene content is preferably 10 to 70 wt %, more preferably 20 to 49 wt %, in view of a balance of the heat resistance and the film-forming ability. Further, the weight average molecular weight of the styrenic thermoplastic elastomer (D) is preferably 30,000 to 300,000. When the molecular weight is small, the film-forming ability tends to become low. When the molecular weight is too large, it is difficult to mix the styrenic thermoplastic elastomer (D) with the polyvinylbenzyl ether compound (C) in some cases.

The mixing ratio of the polyvinylbenzyl ether compound (C) and the styrenic thermoplastic elastomer (D) in the aromatic vinylic curable resin composition of the present invention 3 is not specially limited. However, when the amount of the styrenic thermoplastic elastomer (D) is too large, intended heat resistance and curability cannot be obtained. When the amount of the styrenic thermoplastic elastomer (D) is too small, the film-forming ability descends. Therefore, the weight ratio of polyvinylbenzyl ether compound (C): styrenic thermoplastic elastomer (D) is preferably 20:80 to 95:5, more preferably 30:70 to 85:15, further preferably 40:60 to 70:30.

Although the aromatic vinylic curable resin composition of the present invention 3 undergoes curing itself under heat, a heat-curing catalyst can be incorporated in the composition for increasing the speed of curing and thereby improving workability and economic efficiency. The heat-curing catalyst can be selected from those heat-curing catalysts which are capable of generating cationic or radical active species, which can initiate polymerization of a vinyl group, with heat or light. For example, a cationic polymerization initiator includes diallyl iodonium salt, triallyl sulfonium salt and aliphatic sulfonium salt each of which uses $BF_4$, $PF_6$, $AsF_6$ or $SbF_6$ as a pairing anion. Commercially available products can be used, such as SP70, SP172 and CP 66, supplied by Asahi Denka Kogyo K.K., CI2855 and CI2823 supplied by Nippon Soda Co., Ltd., and SI100L and SI150L supplied by Sanshin Chemical Industry Co., Ltd. A radical polymerization initiator includes benzoin compounds such as benzoin and benzoin methyl; acetophenone compounds such as acetophenone and 2,2-dimethoxy-2-phenylacetophenone; thioxanthone compounds such as thioxanthone and 2,4-diethylthioxanthone; bisazido compounds such as 4,4'-diazidochalcone, 2,6-bis(4'-azidobenzal)cyclohexanone and 4,4'-diazidobenzophenone; azo compounds such as azobisisobutyronitrile, 2,2-azobispropane and hydrazone; and organic peroxides such as 2,5-dimethyl-2,5-di(t-butylperoxy)hexane, 2,5-dimehtyl-2, 5-di(t-butylperoxy)hexyne-3 and dicumyl peroxide. These curing agents can be used alone or in combination.

The aromatic vinylic curable resin composition of the present invention 3 can contain a known thermosetting resin, a flame retardant, a filler, a polymerization inhibitor, an antioxidant, a coupling agent, a dye, a pigment, a thickener, a lubricant, a defoaming agent and an ultraviolet absorber, as required, for adjusting the physical properties and shelf life of cured product.

The thermosetting resin, flame retardant, filler, etc., which can be used in the present invention will be explained.

Examples of the thermosetting resin include epoxy resins such as bisphenol A type epoxy, bisphenol F type epoxy, phenol novolak type epoxy, cresol novolak type epoxy and dicyclopentadiene novolak type epoxy, (meth) acrylates such as bisphenol A type epoxy(meth)acrylate, phenol novolak type epoxy(meth)acrylate, trimethylolpropane tri(meth)acrylate and dipentaerythritol hexa(meth)acrylate, vinyl compounds such as styrene, divinylbenzene, divinylnaphthalene, a divinylbenezene-ethylvinylbenzen copolymer and 1,2-bis(vinylphenyl)ethane, cyanate resins such as bisphenol A dicyanate, tetramethylbisphenol F dicyanate, bisphenol M dicyanate, and phenol novolak cyanates, an oxetane resin, a benzocyclobutene resin, a benzoxazine resin and a maleimide resin. These thermosetting resins can be used alone or in combination.

The flame retardant can be selected from known flame retardants. Examples thereof include halogen flame retardants such as a brominated epoxy resin, brominated polycarbonate, brominated polystyrene, brominated styrene, brominated phthalimide, tetrabromobisphenol A, pentabromobenzyl(meth)acrylate, pentabromotoluene, tribromophenol, hexabromobenzene, decabromodiphenyl ether, chlorinated polystyrene and chlorinated paraffin, phosphorus flame retardants such as red phosphorus, tricresyl phosphate, triphenyl phosphate, cresyl diphenyl phosphate, trixyl phosphate, trialkyl phosphate, dialkyl phosphate, tris(chloroethyl)phosphate and phosphazene, and inorganic flame retardants such as aluminum hydroxide, magnesium hydroxide, zinc borate and antimony trioxide. These flame retardants may be used alone or in combination.

Examples of the filler include fibrous fillers such as a glass fiber, a carbon fiber, an aramid fiber, a silicone carbide fiber, an alumina fiber and a boron fiber, inorganic whiskers such as silicone carbide, silicon nitride, magnesium oxide, potassium titanate and aluminoborate, inorganic acicular fillers such as wollastonite, sonolite, a phosphate fiber and sepiolite, inorganic spherical fillers such as pulverized silica, fused silica, talc, alumina, barium titanate, mica and glass beads, and organic fillers such as particulate polymers obtainable by crosslinking of (meth) acrylic acid ester, styrene, etc. These fillers may be used alone or in combination.

The polymerization inhibitor can be selected from known polymerization inhibitors. Examples thereof include quinines such as hydroquinone, methyl hydroquinone, t-butylhydroquinone, p-benzoquinone, chloranil and trimethylquinone, and aromatic diols. These polymerization inhibitors may be used alone or in combination.

The antioxidant can be selected from known antioxidants. Examples thereof include phenol antioxidants such as 2,6-di-t-butyl-4-methylphenol, 2,2'-methylenebis(6-t-butyl-4-methylphenol), N,N'-hexane-1,6-diylbis[3-(3,5-di-t-butyl-4-hydroxyphenyl)propionamide] and 2,6-di-t-butyl-4-(4,6-bis(octylthio)-1,3,5-triazine-2-ylaminophenol, amine antioxidants and sulfur antioxidants. These antioxidants may be used alone or in combination.

Examples of the coupling agent include silane coupling agents such as vinyltrichlorosilane, vinyltriethoxysilane, vinyltrimethoxysilane, γ-methacryloxypropyltrimethoxysilane, β(3,4-epoxycyclohexyl)ethyltrimethoxysilane, γ-glycidoxypropylmethyldiethoxysilane, N-β(aminoethyl)γ-aminopropylmethylmethoxysilane, γ-aminopropyltriethoxysilane, N-phenyl-γ-aminopropyltrimethoxysilane, γ-mercaptopropyltrimethoxysilane and γ-chloropropyltrimethoxysilane, titanate coupling agents, aluminum coupling agents, zircoaluminate coupling agents, silicone coupling agents and fluorine coupling agents. These coupling agents may be used alone or in combination.

Then, the curable film of the present invention 3 will be explained. The curable film of the present invention 3 can be obtained by processing the aromatic vinylic curable resin composition of the present invention 3 into a film form. The method of processing the aromatic vinylic curable resin composition into a film form is, for example, a method in which the curable resin composition is dissolved in a solvent to prepare a curable varnish, the curable varnish is applied to a film-form or plate-form base material, and then the solvent is removed by drying. The base material is not specially limited. Examples of the film-form base material include a polyethylene film, a polypropylene film, a polycarbonate film, a polyester film, a polyimide film, an ethylene tetrafluoroethylene copolymer film, films obtained by release-treating surfaces of these films, and conductor foils such as copper foil. Examples of the plate-form base material include a glass plate, a stainless steel plate and an aluminum plate. When a conductor foil is used as the base material, a conductor-layer-formed curable film can be obtained. The thus-obtained curable film can be, for example, used as a curable film for build-up for the production of printed wiring boards or a resin-attached copper foil.

Examples of the solvent to be used include acetone, methyl ethyl ketone, ethylene glycol monomethyl ether acetate, propylene glycol dimethyl ether, toluene, xylene, tetrahydrofuran and N,N-dimethylformamide. The solvent is not limited to these solvents. Further, these solvents may be used alone or in combination. In view of solubility, methyl ethyl ketone, methyl isobutyl ketone, toluene or xylene is preferred.

Drying conditions for the drying of the solvent are not specially limited. When a low temperature is used, the solvent is apt to remain in the curable film. When a high temperature is used, curing of the polyvinylbenzyl ether compound (C) advances. Therefore, drying is preferably carried out at a temperature of 40° C. to 150° C. for 1 to 90 minutes. The thickness of the curable film can be adjusted according to the concentration of the curable varnish and the thickness of application of the varnish. When the thickness of application of the varnish is too thick, the solvent is apt to remain at the drying time. Therefore, the thickness of the curable film is preferably 0.1 to 500 μm.

The cured film of the present invention 3 can be obtained by curing the curable film of the present invention under heat. The curing conditions vary depending upon the presence or absence of use of the curing catalyst and the presence or absence of joint use of the different thermosetting resin, while the curing is preferably carried out at a temperature of 150 to 250° C. for 0.1 to 5 hours. Further, the curing can be carried out in vacuum, under an inert gas atmosphere and/or under pressure, as required.

The conductor-layer-formed film of the present invention 3 can be obtained by, for example, a method in which the above conductor-layer-formed curable film is cured or a method in which the curable film is cured by heating and a conductor layer is formed on a surface of the resultant film by the use of electroless plating, sputtering or an electrically conductive paste. The thus-obtained conductor-layer-formed film can be used as a printed wiring board by, for example, forming a circuit from the conductor layer.

EXAMPLES

The present invention will be more specifically explained with reference to Examples and Comparative Examples, hereinafter, while the present invention shall not be limited to these Examples. "part" stands for "part by weight" in Examples and Comparative Examples. Further, measurements were carried out in accordance with the following methods.

(1) Molecular Weight

Number average molecular weights (Mn) and weight average molecular weights (Mw) were obtained by a gel permeation chromatography (GPC) method. Data processing was carried out according to the GPC curve and molecular weight calibration curve of a sample. The molecular weight calibration curve was obtained by making an approximation of a relation between the molecular weight of a standard polystylene and the dissolution time with the following equation, $$\text{Log } M = A_0 X^3 + A_1 X^2 + A_2 X + A_3 + A_4/X^2$$

wherein M: a molecular weight, X: an elution time—19 (minute), and A: a coefficient.

(2) Hydroxyl Group Equivalent

A solution having an acetic anhydride:pyridine volume ratio of 1:9 was added to a solid sample (Sg), and a hydroxyl group was acetylated by heating at 95° C. for 1 hour. After cooling, the resultant mixture was diluted with a solution having a toluene:pure water:methyl ethyl ketone volume ratio of 1:2:2. Phenol phthalein was added as an indicator. Excess acetic acid was titrated with 0.25N sodium hydroxide aqueous solution (AmL). A blank test was carried out without the solid sample (BmL). The hydroxyl group equivalent of solid was calculated on the basis of the following equation.

Hydroxyl group equivalent=$S \times 1000/(B-A)/0.25/f$ wherein f: titer of 0.25N sodium hydroxide aqueous solution.

(3) Epoxy Equivalent 1 mL of a cresol red indicator was dissolved in 100 mL of anhydrous ethanol and the mixture was neutralized with 0.1N sodium hydroxide aqueous solution, to obtain a neutralized solution (preparation solution). 0.2N hydrochloric acid dioxane solution was added to a solid sample (Sg) and the resultant mixture was allowed to stand at room temperature for 15 minutes. The preparation solution was added thereto. Excess hydrochloric acid was titrated with 0.1N sodium hydroxide aqueous solution (AmL). A blank test was carried out without the solid sample (BmL). The epoxy equivalent of solid was calculated on the basis of the following equation.

Epoxy equivalent=$S \times 1000/(B-A)/0.1/f$ wherein f: titer of 0.1N sodium hydroxide aqueous solution.

(4) Breaking Strength

Measurement was carried out with an autograph by the use of a cage type bending test tool. A sample size was 10 mm×40 mm×about 1 mm. Measurement was carried out under conditions of a three-point bending test, a span 20 mm and a stroke 1 mm/min.

(5) Gelation Time

A period of time required for gelation under a condition of 160° C. was measured with a gelation testing machine. A varnish having a resin content of 50 wt % obtained by dissolving an epoxy resin and a curing agent in methyl ethyl ketone was used as a measurement sample.

(6) Glass Transition Temperature

A glass transition temperature was obtained from a peak top of loss modulus (E") in a dynamic viscoelasticity measurement. A sample size was 10 mm×55 mm×about 1 mm. Measurement was carried out under conditions of dual-support beam bending, a distance between chucks of 20 mm, a frequency of 10 Hz, an amplitude of 10 μm and a temperature-increase of 5° C./min.

(7) Dielectric Constant and Dielectric Loss Tangent

Cured product: A sample having a size of 100 mm×1.5 mm×about 1 mm was measured for a dielectric constant and a dielectric loss tangent by a cavity resonator perturbation method.

Cured film: A film having a size of 100 mm×40 mm was cylindrically roll up to prepare a sample for measurement. The sample was measured for a dielectric constant and a dielectric loss tangent by a cavity resonator perturbation method.

(8) Appearance of Curable Film

The appearance of a curable film (size: 80 mm×200 mm) was visually observed and the presence or absence of cloudiness, a crack or a cleft was confirmed (O: transparent, no crack, no cleft, x: cloudiness, a crack or a cleft occurred)

(9) Glass Transition Temperature

A film having a size of 3 mm×30 mm was used as a sample for measurement. The sample was measured for a glass transition temperature by a TMA (TMA120C: supplied by Seiko Instruments Inc.) tensile method at a load of 5 g at a distance between chucks of 10 mm and at a temperature-increase of 10° C./min.

(10) Dimensional Change Rate

From data obtained in the above TMA measurement, a dimensional change rate at 250° C. was calculated on the basis of 50° C.

Example 1

Synthesis of Polyfunctional Phenylene Ether Oligomer (a)

1.54 g (6.88 mmol) of $CuBr_2$, 0.506 g (2.94 mmol) of di-tert-butylethylenediamine, 15.4 g (152 mmol) of butyldimethylamine, 0.7 g (1.73 mmol) of trioctyl methyl ammonium chloride and 2,600 g of toluene were charged into a 12-liter longitudinally-long reactor equipped with a stirrer, a thermometer, an air-introducing tube and baffleplates. The mixture was stirred at a reaction temperature of 41° C. Separately, 120 g (0.344 mol) of 4,4'-[(4-hydroxyphenyl)methylene]bis(2,6-dimethylphenol), 210 g (1.72 mol) of 2,6-dimethylphenol, 1.26 g (5.65 mmol) of $CuBr_2$, 0.414 g (2.40 mmol) of di-tert-butylethylenediamine and 12.6 g (125 mmol) of butyldimethylamine were dissolved in 1,730 g of methanol in advance, to prepare a mixed solution (trihydric phenol:monohydric phenol molar ratio, 1:5). The mixed solution was heated to 50° C. and dropwise added to the mixture in the reactor over 230 minutes with stirring at 1020 rpm while carrying out bubbling with a mixed gas (oxygen concentration 8.0%) of 2.1 L/min of air and 3.2 L/min of nitrogen. After the completion of the addition, the gas bubbling was terminated. An aqueous solution of 17.0 g (37.5 mmol) of tetrasodium ethylenediamine tetraacetate in 1,350 g of pure water was added to the mixture, and the resultant mixture was stirred at 600 rpm for 30 minutes, to terminate the reaction. Then, the reaction mixture was once washed with pure water, to obtain a solution. The thus-obtained solution was concentrated with an evaporator, to obtain 650 g of a toluene solution having a solid content of 52 wt %. The toluene solution was measured by a gel permeation chromatography (GPC) method. As a result, the number average molecular weight (Mn) thereof was 1,098, and the weight average molecular weight (Mw) thereof was 1,751. According to NMR and FDMS analyses, it was confirmed that a polyfunctional phenylene ether oligomer (a) was generated. The hydroxyl group equivalent thereof was 308 g/eq.

Example 2

Synthesis of Polyfunctional Phenylene Ether Oligomer (b)

1.62 g (7.22 mmol) of $CuBr_2$, 0.531 g (3.09 mmol) of di-tert-butylethylenediamine, 16.2 g (160 mmol) of butyldimethylamine, 0.7 g (1.73 mmol) of trioctyl methyl ammonium chloride and 2,730 g of toluene were charged into a 12-liter longitudinally-long reactor equipped with a stirrer, a thermometer, an air-introducing tube and baffleplates. The mixture was stirred at a reaction temperature of 41° C. Separately, 126 g (0.361 mol) of 4,4'-[(4-hydroxyphenyl)methylene]bis(2,6-dimethylphenol), 164 g (1.34 mol) of 2,6-dimethylphenol, 63.6 g (0.47 mol) of 2,3,6-trimethylphenol, 1.32 g (5.93 mmol) of $CuBr_2$, 0.435 g (2.52 mmol) of di-tert-butylethylenediamine and 13.2 g (131 mmol) of butyl dimethylamine were dissolved in 1,820 g of methanol in advance, to prepare a mixed solution (trihydric phenol:monohydric phenol molar ratio, 1:5). The mixed solution was heated to 50° C., and dropwise added to the mixture in the reactor over 240 minutes with stirring at 1020 rpm while carrying out bubbling with a mixed gas (oxygen concentration 8.0%) of 2.1 L/min of air and 3.2 L/min of nitrogen. After the completion of the addition, the gas bubbling was terminated. An aqueous solution of 17.9 g (39.4 mmol) of tetrasodium ethylenediamine tetraacetate in 1,420 g of pure water was added to the mixture, and the resultant mixture was stirred at 600 rpm for 30 minutes, to terminate the reaction. Then, the reaction mixture was once washed with pure water, to obtain a solution. The thus-obtained solution was concentrated with an evaporator, to obtain 707 g of a toluene solution of a polyfunctional phenylene ether oligomer (b) having a solid content of 50 wt %. The polyfunctional phenylene ether oligomer (b) was measured by a gel permeation chromatography (GPC) method. As a result, the number average molecular weight (Mn) thereof was 989, and the weight average molecular weight (Mw) thereof was 1,630. According to NMR and FDMS analyses, it was confirmed that the polyfunctional phenylene ether oligomer (b) was generated. The solid had a hydroxyl group equivalent of 310 g/eq.

Example 3

Synthesis of Polyfunctional Phenylene Ether Oligomer (c)

1.54 g (6.88 mmol) of $CuBr_2$, 0.506 g (2.94 mmol) of di-tert-butylethylenediamine, 15.4 g (152 mmol) of butyldimethylamine, 0.7 g (1.73 mmol) of trioctyl methyl ammonium chloride and 2,600 g of toluene were charged into a 12-liter longitudinally-long reactor equipped with a stirrer, a thermometer, an air-introducing tube and baffleplates. The mixture was stirred at a reaction temperature of 41° C. Separately, 120 g (0.344 mol) of 4,4'-[(3-hydroxyphenyl)methylene]bis(2,6-dimethylphenol), 210 g (1.72 mol) of 2,6-dimethylphenol, 1.26 g (5.65 mmol) of $CuBr_2$, 0.414 g (2.40 mmol) of di-tert-butylethylenediamine and 12.6 g (125 mmol) of butyldimethylamine were dissolved in 1,730 g of methanol in advance, to prepare a mixed solution (trihydric phenol:monohydric phenol molar ratio, 1:5). The mixed solution was heated to 50° C. and dropwise added to the mixture in the reactor over 220 minutes with stirring at 1020 rpm while carrying out bubbling with a mixed gas (oxygen concentration 8.0%) of 2.1 L/min of air and 3.2 L/min of nitrogen. After the completion of the addition, the gas bubbling was terminated. An aqueous solution of 17.0 g (37.5 mmol) of tetrasodium ethylenediamine tetraacetate in 1,350 g of pure water was added to the mixture, and the resultant mixture was stirred at 600 rpm for 30 minutes, to terminate the reaction. Then, the reaction mixture was once washed with pure water, to obtain a solution. The thus-obtained solution was concentrated with an evaporator, to obtain 520 g of a toluene solution having a solid content of 60 wt %. The toluene solution was measured by a gel permeation chromatography (GPC) method. As a result, the number average molecular weight (Mn) thereof was 1,054, and the weight average molecular weight (Mw) thereof was 1,649. According to NMR and FDMS analyses, it was confirmed that a polyfunctional phenylene ether oligomer (c) was generated. The hydroxyl group equivalent thereof was 323 g/eq.

Example 4

Synthesis of Polyfunctional Phenylene Ether Oligomer (d)

1.42 g (6.37 mmol) of $CuBr_2$, 0.462 g (2.68 mmol) of di-tert-butylethylenediamine, 14.2 g (141 mmol) of butyldimethylamine, 0.7 g (1.73 mmol) of trioctyl methyl ammonium chloride and 2,600 g of toluene were charged into a 12-liter longitudinally-long reactor equipped with a stirrer, a thermometer, an air-introducing tube and baffleplates. The mixture was stirred at a reaction temperature of 41° C. Separately, 120 g (0.319 mol) of 4,4'-[(4-hydroxyphenyl)methylene]bis(2,3,6-trimethylphenol), 194 g (1.59 mol) of 2,6-dimethylphenol, 1.16 g (5.23 mmol) of $CuBr_2$, 0.378 g (2.19 mmol) of di-tert-butylethylenediamine and 11.6 g (115 mmol) of butyldimethylamine were dissolved in 1,650 g of methanol in advance, to prepare a mixed solution (trihydric phenol:monohydric phenol molar ratio, 1:5). The mixed solution was heated to 50° C. and dropwise added to the mixture in the reactor over 230 minutes with stirring at 1020 rpm while carrying out bubbling with a mixed gas (oxygen concentration 8.0%) of 2.1 L/min of air and 3.2 L/min of nitrogen. After the completion of the addition, the gas bubbling was terminated. An aqueous solution of 15.7 g (34.7 mmol) of tetrasodium ethylenediamine tetraacetate in 1,330 g of pure water was added to the mixture, and the resultant mixture was stirred at 600 rpm for 30 minutes, to terminate the reaction. Then, the reaction mixture was once washed with pure water, to obtain a solution. The thus-obtained solution was concentrated with an evaporator, to obtain 500 g of a toluene solution having a solid content of 62 wt %. The toluene solution was measured by a gel permeation chromatography (GPC) method. As a result, the number average molecular weight (Mn) thereof was 1,143, and the weight average molecular weight (Mw) thereof was 1,621. According to NMR and FDMS analyses, it was confirmed that a polyfunctional phenylene ether oligomer (d) was generated. The hydroxyl group equivalent thereof was 336 g/eq.

Example 5

Synthesis of Polyfunctional Phenylene Ether Oligomer (e)

1.42 g (6.37 mmol) of $CuBr_2$, 0.462 g (2.68 mmol) of di-tert-butylethylenediamine, 14.2 g (141 mmol) of butyldimethylamine, 0.7 g (1.73 mmol) of trioctyl methyl ammonium chloride and 2,600 g of toluene were charged into a 12-liter longitudinally-long reactor equipped with a stirrer, a thermometer, an air-introducing tube and baffleplates. The mixture was stirred at a reaction temperature of 41° C. Separately, 120 g (0.319 mol) of 4,4'-[(3-hydroxyphenyl)methylene]bis(2,3,6-trimethylphenol), 194 g (1.59 mol) of 2,6-dimethylphenol, 1.16 g (5.23 mmol) of $CuBr_2$, 0.378 g (2.19 mmol) of di-tert-butylethylenediamine and 11.6 g (115 mmol) of butyldimethylamine were dissolved in 1,650 g of methanol in advance, to prepare a mixed solution (trihydric phenol:monohydric phenol molar ratio, 1:5). The mixed solution was heated to 50° C. and dropwise added to the mixture in the reactor over 240 minutes with stirring at 1020 rpm while carrying out bubbling with a mixed gas (oxygen concentration 8.0%) of 2.1 L/min of air and 3.2 L/min of nitrogen. After the completion of the addition, the gas bubbling was terminated. An aqueous solution of 15.7 g (34.7 mmol) of tetrasodium ethylenediamine tetraacetate in 1,330 g of pure water was added to the mixture, and the resultant mixture was stirred at 600 rpm for 30 minutes, to terminate the reaction. Then, the reaction mixture was once washed with pure water, to obtain a solution. The thus-obtained solution was concentrated with an evaporator, to obtain 500 g of a toluene solution having a solid resin content of 62 wt %. The toluene solution was measured by a gel permeation chromatography (GPC) method. As a result, the number average molecular weight (Mn) thereof was 1,065, and the weight average molecular weight (Mw) thereof was 1,517. According to NMR and FDMS analyses, it was confirmed that a polyfunctional phenylene ether oligomer (e) was generated. The hydroxyl group equivalent thereof was 325 g/eq.

Example 6

Synthesis of Bifunctional Phenylene Ether Oligomer (f)

2.26 g (10.1 mmol) of $CuBr_2$, 0.737 g (4.28 mmol) of di-tert-butylethylenediamine, 22.7 g (224 mmol) of butyldimethylamine, 0.7 g (1.73 mmol) of trioctyl methyl ammonium chloride, 1,441 g of toluene and 1,241 g of methanol were charged into a 12-liter longitudinally-long reactor equipped with a stirrer, a thermometer, an air-introducing tube and baffleplates. The mixture was stirred at a reaction temperature of 41° C. Separately, 149 g (0.253 mol) of 4,4', 4",4'''-(1,4-phenylenedimethylidene)tetrakis(2,6-dimethylphenol), 309 g (2.53 mol) of 2,6-dimethylphenol, 1.85 g (8.28 mmol) of $CuBr_2$, 0.603 g (3.50 mmol) of di-tert-butylethylenediamine and 18.5 g (183 mmol) of butyldimethylamine were dissolved in 1,244 g of toluene and 1,071 g of methanol in advance, to prepare a mixed solution (tetrahydric phenol:monohydric phenol molar ratio, 1:10). The mixed solution was heated to 50° C. and dropwise added to the mixture in the reactor over 220 minutes with stirring at 1020 rpm while carrying out bubbling with a mixed gas (oxygen concentration 8.0%) of 2.1 L/min of air and 3.2 L/min of nitrogen. After the completion of the addition, the gas bubbling was terminated. An aqueous solution of 25.0 g (55.2 mmol) of tetrasodium ethylenediamine tetraacetate in 1,561 g of pure water was added to the mixture, and the resultant mixture was stirred at 600 rpm for 30 minutes, to terminate the reaction. Then, the reaction mixture was once washed with pure water, to obtain a solution. The thus-obtained solution was concentrated with an evaporator, to obtain 767 g of a toluene solution having a solid content of 60 wt %. The toluene solution was measured by a gel permeation chromatography (GPC) method. As a result, the number average molecular weight (Mn) thereof was 2,127, and the weight average molecular weight (Mw) thereof was 3,092. According to NMR and FDMS analyses, it was confirmed that a polyfunctional phenylene ether oligomer (f) was generated. The hydroxyl group equivalent thereof was 561 g/eq.

Comparative Example 1

Synthesis of Bifunctional Phenylene Ether Oligomer (g)

2.22 g (9.94 mmol) of $CuBr_2$, 2.57 g (14.9 mmol) of di-tert-butylethylenediamine, 27.4 g (271 mmol) of butyldimethylamine, 2,248 g of toluene and 1,124 g of methanol were charged into a 12-liter longitudinally-long reactor equipped with a stirrer, a thermometer, an air-introducing tube and baffleplates. The mixture was stirred at a reaction temperature of 41° C. Separately, 56.1 g (0.207 mol) of 2,2',3,3',5,5'-hexamethyl-4,4'-biphenol, 380 g (3.11 mol) of 2,6-dimethylphenol, 1.75 g (7.84 mmol) of $CuBr_2$, 2.03 g (11.8 mmol) of di-tert-butylethylenediamine and 21.6 g (213 mmol) of butyldimethylamine were dissolved in 1,234 g of toluene and 617 g of methanol in advance, to prepare a mixed solution (dihydric phenol:monohydric phenol molar ratio, 1:10). The mixed solution was heated to 50° C., and dropwise added to the mixture in the reactor over 240 minutes with stirring at 1020 rpm while carrying out bubbling with a mixed gas (oxygen concentration 8.0%) of 2.1 L/min of air and 3.2 L/min of nitrogen. After the completion of the addition, the gas bubbling was terminated. An aqueous solution of 23.7 g (52.3 mmol) of tetrasodium ethylenediamine tetraacetate in 1,500 g of pure water was added to the mixture, and the resultant mixture was stirred at 600 rpm for 30 minutes, to terminate the reaction. Then, the reaction mixture was once washed with pure water, to obtain a solution. The thus-obtained solution was concentrated with an evaporator, to obtain 650 g of a toluene solution having a solid content of 65 wt %. The toluene solution was measured by a gel permeation chromatography (GPC) method. As a result, the number average molecular weight (Mn) thereof was 2,150, and the weight average molecular weight (Mw) thereof was 3,805. According to NMR and FDMS analyses, it was confirmed that a bifunctional phenylene ether oligomer (g) was generated. The hydroxyl group equivalent thereof was 1,050 g/eq.

Example 7

Synthesis of Polyvinyl Benzyl Ether Compound (h)

183 g (hydroxyl group 0.258 mol) of the toluene solution of the polyfunctional phenylene ether oligomer (a), obtained in Example 1, and 53.5 g (0.351 mol) of chloromethyl styrene were added to a 2-liter rounded reactor equipped with a magnetic stirrer, a Dimroth condenser and a thermometer. 400 g of dimethylformamide (DMF, hereinafter) was added to the reactor. The atmosphere in the reactor was replaced with nitrogen. Then, the mixture was stirred at a reaction temperature of 50° C. 66.7 g (0.351 mol) of a methanol solution of 28.4 wt % of sodium methoxide was filled into a drop funnel, and it was added to the reactor over 40 minutes. The mixture was stirred at 50° C. for 1.25 hours. 5.2 g (0.027 mol) of an additional methanol solution of 28.4 wt % of sodium methoxide was further dropwise added. After the completion of the dropwise addition, the mixture was allowed to react at 60° C. for 240 minutes with stirring. 3.1 g (0.027 mol) of a 85 wt % phosphoric acid aqueous solution was dropwise added, and the mixture was stirred for 10 minutes. It was confirmed that pH was 7. A generated salt was removed by suction filtration. Then, the reaction solution was dropwise added to a mixed solution of 2,150 g of methanol and 545 g of water over 5 minutes, to obtain a solid. The solid was recovered by suction filtration and then washed with 400 g of a mixed solution of methanol:water=1:1 by the use of an agitator for 15 minutes four times. Then, the solid was dried with a vacuum dryer at 60° C. for 30 hours, to obtain 102 g of a solid matter. Functional group conversion was confirmed owing to the disappearance of the absorption peak (3600 cm-1) of a phenolic hydroxyl group verified from IR analysis of the solid matter and the appearance of a peak (4.6-5.8 ppm) derived from vinyl benzyl ether verified from NMR analysis thereof. A polyvinyl benzyl ether compound (h) was thus obtained. The polyvinyl benzyl ether compound (h) was measured by a gel permeation chromatography (GPC) method. As a result, the number average molecular weight (Mn) thereof was 1,279, and the weight average molecular weight (Mw) thereof was 1,758.

Example 8

Synthesis of Polyvinyl Benzyl Ether Compound (i)

160 g (hydroxyl group 0.260 mol) of the toluene solution of the polyfunctional phenylene ether oligomer (b), obtained in Example 2, and 53.3 g (0.350 mol) of chloromethyl styrene were added to a 2-liter rounded reactor equipped with a magnetic stirrer, a Dimroth condenser and a thermometer. 400 g of DMF was added to the reactor. The atmosphere in the reactor was replaced with nitrogen. Then, the mixture was stirred at a reaction temperature of 50° C. 66.6 g (0.350 mol) of a methanol solution of 28.4 wt % of sodium methoxide was filled into a drop funnel, and it was added to the reactor over 40 minutes. The mixture was stirred at 50° C. for 1.25 hours. 5.2 g (0.027 mol) of an additional methanol solution of 28.4 wt % of sodium methoxide was further dropwise added. After the completion of the dropwise addition, the mixture was allowed to react at 60° C. for 240 minutes with stirring. 3.1 g (0.027 mol) of an 85 wt % phosphoric acid aqueous solution was dropwise added, and the mixture was stirred for 10 minutes. It was confirmed that pH was 7. A generated salt was removed by suction filtration. Then, the reaction solution was dropwise added to a mixed solution of 2,200 g of methanol and 550 g of water over 5 minutes, to obtain a solid. The solid was recovered by suction filtration and then washed with 400 g of a mixed solution of methanol:water=1:1 by the use of an agitator for 15 minutes four times. Then, the solid was dried with a vacuum dryer at 60° C. for 30 hours, to obtain 105 g of a solid matter. Functional group conversion was confirmed owing to the disappearance of the absorption peak (3600 cm-1) of a phenolic hydroxyl group verified from IR analysis of the solid matter and the appearance of a peak (4.6-5.8 ppm) derived from vinyl benzyl ether verified from NMR analysis thereof. A polyvinyl benzyl ether compound (i) was thus obtained. The polyvinyl benzyl ether compound (i) was measured by a gel permeation chromatography (GPC) method. As a result, the number average molecular weight (Mn) thereof was 1,251, and the weight average molecular weight (Mw) thereof was 1,740.

Example 9

Synthesis of Polyvinyl Benzyl Ether Compound (j)

113 g (hydroxyl group 0.171 mol) of the toluene solution of the polyfunctional phenylene ether oligomer (c), obtained in Example 3, and 43.8 g (0.287 mol) of chloromethyl styrene were added to a 2-liter rounded reactor equipped with a magnetic stirrer, a Dimroth condenser and a thermometer. 320 g of DMF was added to the reactor. The atmosphere in the reactor was replaced with nitrogen. Then, the mixture was stirred at a reaction temperature of 50° C. 54.6 g (0.287 mol) of a methanol solution of 28.4 wt % of sodium methoxide was filled into a drop funnel, and it was added to the reactor over 40 minutes. The mixture was stirred at 50° C. for 1.25 hours. 3.4 g (0.018 mol) of an additional methanol solution of 28.4 wt % of sodium methoxide was further dropwise added. After the completion of the dropwise addition, the mixture was allowed to react at 60° C. for 240 minutes with stirring. 2.07 g (0.018 mol) of an 85 wt % phosphoric acid aqueous solution was dropwise added, and the mixture was stirred for 10 minutes. It was confirmed that pH was 7. A generated salt was removed by suction filtration. Then, the reaction solution was dropwise added to a mixed solution of 2,144 g of methanol and 513 g of water over 5 minutes, to obtain a solid. The solid was recovered by suction filtration and then washed with 350 g of a mixed solution of methanol water=1:1 by the use of an agitator for 15 minutes four times. Then, the solid was dried with a vacuum dryer at 60° C. for 30 hours, to obtain 74.6 g of a solid matter. Functional group conversion was confirmed owing to the disappearance of the absorption peak (3600 cm-1) of a phenolic hydroxyl group verified from IR analysis of the solid matter and the appearance of a peak (4.6-5.8 ppm) derived from vinyl benzyl ether verified from NMR analysis thereof. A polyvinyl benzyl ether compound (j) was thus obtained. The polyvinyl benzyl ether compound (j) was measured by a gel permeation chromatography (GPC) method. As a result, the number average molecular weight (Mn) thereof was 1,243, and the weight average molecular weight (Mw) thereof was 1,720.

Example 10

Synthesis of Polyvinyl Benzyl Ether Compound (k)

148 g (hydroxyl group 0.250 mol) of the toluene solution of the polyfunctional phenylene ether oligomer (d), obtained in Example 4, and 59.5 g (0.390 mol) of chloromethyl styrene were added to a 2-liter rounded reactor equipped with a magnetic stirrer, a Dimroth condenser and a thermometer. 320 g of DMF was added to the reactor. The atmosphere in the reactor was replaced with nitrogen. Then, the mixture was stirred at a reaction temperature of 50° C. 74.1 g (0.390 mol) of a methanol solution of 28.4 wt % of sodium methoxide was filled into a drop funnel, and it was added to the reactor over 40 minutes. The mixture was stirred at 50° C. for 1.25 hours. 4.9 g (0.026 mol) of an additional methanol solution of 28.4 wt % of sodium methoxide was further dropwise added. After the completion of the dropwise addition, the mixture was allowed to react at 60° C. for 240 minutes with stirring. 3.0 g (0.026 mol) of an 85 wt % phosphoric acid aqueous solution was dropwise added, and the mixture was stirred for 10 minutes. It was confirmed that pH was 7. A generated salt was removed by suction filtration. Then, the reaction solution was dropwise added to a mixed solution of 2,220 g of methanol and 525 g of water over 5 minutes, to obtain a solid. The solid was recovered by suction filtration and then washed with 350 g of a mixed solution of methanol water=1:1 by the use of an agitator for 15 minutes four times. Then, the solid was dried with a vacuum dryer at 60° C. for 30 hours, to obtain 97.1 g of a solid matter. Functional group conversion was confirmed owing to the disappearance of the absorption peak (3600 cm-1) of a phenolic hydroxyl group verified from IR analysis of the solid matter and the appearance of a peak (4.6-5.8 ppm) derived from vinyl benzyl ether verified from NMR analysis thereof. A polyvinyl benzyl ether compound (k) was thus obtained. The polyvinyl benzyl ether compound (k) was measured by a gel permeation chromatography (GPC) method. As a result, the number average molecular weight (Mn) thereof was 1,323, and the weight average molecular weight (Mw) thereof was 1,718.

Example 11

Synthesis of Polyvinyl Benzyl Ether Compound (l)

135 g (hydroxyl group 0.249 mol) of the toluene solution of the polyfunctional phenylene ether oligomer (e), obtained in Example 5, and 63.4 g (0.415 mol) of chloromethyl styrene were added to a 2-liter rounded reactor equipped with a magnetic stirrer, a Dimroth condenser and a thermometer. 320 g of DMF was added to the reactor. The atmosphere in the reactor was replaced with nitrogen. Then, the mixture was stirred at a reaction temperature of 50° C. 79.0 g (0.415 mol) of a methanol solution of 28.4 wt % of sodium methoxide was filled into a drop funnel, and it was added to the reactor over 40 minutes. The mixture was stirred at 50° C. for 1.25 hours. 4.94 g (0.026 mol) of an additional methanol solution of 28.4 wt % of sodium methoxide was further dropwise added. After the completion of the dropwise addition, the mixture was allowed to react at 60° C. for 240 minutes with stirring. 3.0 g (0.026 mol) of an 85 wt % phosphoric acid aqueous solution was dropwise added, and the mixture was stirred for 10 minutes. It was confirmed that pH was 7. A generated salt was removed by suction filtration. Then, the reaction solution was dropwise added to a mixed solution of 2,275 g of methanol and 545 g of water over 5 minutes, to obtain a solid. The solid was recovered by suction filtration and then washed with 360 g of a mixed solution of methanol water=1:1 by the use of an agitator for 15 minutes four times. Then, the solid was dried with a vacuum dryer at 60° C. for 30 hours, to obtain 98.6 g of a solid matter. Functional group conversion was confirmed owing to the disappearance of the absorption peak (3600 cm-1) of a phenolic hydroxyl group verified from IR analysis of the solid matter and the appearance of a peak (4.6-5.8 ppm) derived from vinyl benzyl ether verified from NMR analysis thereof. A polyvinyl benzyl ether compound (1) was thus obtained. The polyvinyl benzyl ether compound (1) was measured by a gel permeation chromatography (GPC) method. As a result, the number average molecular weight (Mn) thereof was 1,258, and the weight average molecular weight (Mw) thereof was 1,632.

Example 12

Synthesis of Polyvinyl Benzyl Ether Compound (m)

100 g (hydroxyl group 0.107 mol) of the toluene solution of the polyfunctional phenylene ether oligomer (f), obtained in Example 6, and 22.1 g (0.145 mol) of chloromethyl styrene were added to a 1-liter rounded reactor equipped with a magnetic stirrer, a Dimroth condenser and a thermometer. 200 g of DMF was added to the reactor. The atmosphere in the reactor was replaced with nitrogen. Then, the mixture was stirred at a reaction temperature of 50° C. 27.6 g (0.145 mol) of a methanol solution of 28.4 wt % of sodium methoxide was filled into a drop funnel, and it was added to the reactor over 40 minutes. The mixture was stirred at 50° C. for 1.25 hours. 2.1 g (0.011 mol) of an additional methanol solution of 28.4 wt % of sodium methoxide was further dropwise added. After the completion of the dropwise addition, the mixture was allowed to react at 60° C. for 240 minutes with stirring. 1.3 g (0.011 mol) of an 85 wt % phosphoric acid aqueous solution was dropwise added, and the mixture was stirred for 10 minutes. It was confirmed that pH was 7. A generated salt was removed by suction filtration. Then, the reaction solution was dropwise added to a mixed solution of 1,061 g of methanol and 250 g of water over 5 minutes, to obtain a solid. The solid was recovered by suction filtration and then washed with 200 g of a mixed solution of methanol:water=1:1 by the use of an agitator for 15 minutes four times. Then, the solid was dried with a vacuum dryer at 60° C. for 30 hours, to obtain 57.9 g of a solid matter. Functional group conversion was confirmed owing to the disappearance of the absorption peak (3600 cm-1) of a phenolic hydroxyl group verified from IR analysis of the solid matter and the appearance of a peak (4.6-5.8 ppm) derived from vinyl benzyl ether verified from NMR analysis thereof. A polyvinyl benzyl ether compound (m) was thus obtained. The polyvinyl benzyl ether compound (m) was measured by a gel permeation chromatography (GPC) method. As a result, the number average molecular weight (Mn) thereof was 2,180, and the weight average molecular weight (Mw) thereof was 3,021.

Comparative Example 2

Synthesis of Bifunctional Vinyl Benzyl Ether Compound (n)

100 g (hydroxyl group 0.114 mol) of the toluene solution of the bifunctional phenylene ether oligomer (g), obtained in Comparative Example 1, and 21.8 g (0.143 mol) of chloromethyl styrene were added to a 2-liter rounded reactor equipped with a magnetic stirrer, a Dimroth condenser and a thermometer. 400 g of DMF was added to the reactor. The atmosphere in the reactor was replaced with nitrogen. Then, the mixture was stirred at a reaction temperature of 50° C. 27.3 g (0.143 mol) of a methanol solution of 28.2 wt % of sodium methoxide was filled into a drop funnel, and it was added to the reactor over 40 minutes. The mixture was stirred at 50° C. for 1.25 hours. 6.8 g (0.036 mol) of an additional methanol solution of 28.2 wt % of sodium methoxide was further dropwise added. After the completion of the dropwise addition, the mixture was allowed to react at 60° C. for 240 minutes with stirring. 3.9 g (0.034 mol) of a 85 wt % phosphoric acid aqueous solution was dropwise added, and the mixture was stirred for 10 minutes. It was confirmed that pH was 7. A generated salt was removed by suction filtration. Then, the reaction solution was dropwise added into a mixed solution of 2,400 g of methanol and 1,000 g of water over 5 minutes, to obtain a solid. The solid was recovered by suction filtration and then washed with 400 g of a mixed solution of methanol:water=1:1 by the use of an agitator for 15 minutes four times. Then, the solid was dried with a vacuum dryer at 60° C. for 30 hours, to obtain 113 g of a solid matter. Functional group conversion was confirmed owing to the disappearance of the absorption peak (3600 cm-1) of a phenolic hydroxyl group verified from IR analysis of the solid matter and the appearance of a peak (4.6-5.8 ppm) derived from vinyl benzyl ether verified from NMR analysis thereof. A bifunctional vinyl benzyl ether compound (n) was thus obtained. The bifunctional vinyl benzyl ether compound (n) was measured by a gel permeation chromatography (GPC) method. As a result, the number average molecular weight (Mn) thereof was 2,200, and the weight average molecular weight (Mw) thereof was 3,942.

Comparative Example 3

Synthesis of Vinyl Benzyl Ether Compound (O)

40 g (hydroxyl group 0.196 mol) of a biphenyl phenol aralkyl resin (GPH65, supplied by Nippon Kayaku Co., Ltd.) and 37.4 g (0.245 mol) of chloromethyl styrene were added to a 1-liter rounded reactor equipped with a magnetic stirrer, a Dimroth condenser and a thermometer. 200 g of DMF was added to the reactor. The atmosphere in the reactor was replaced with nitrogen. Then, the mixture was stirred at a reaction temperature of 50° C. 46.6 g (0.245 mol) of a methanol solution of 28.4 wt % of sodium methoxide was filled into a drop funnel, and it was added to the reactor over 30 minutes. The mixture was stirred at 50° C. for 1 hour. 3.9 g (0.021 mol) of an additional methanol solution of 28.4 wt % of sodium methoxide was further dropwise added. After the completion of the dropwise addition, the mixture was allowed to react at 60° C. for 4.5 hours with stirring. 2.4 g (0.021 mol) of an 85 wt % phosphoric acid aqueous solution was dropwise added, and the mixture was stirred for 10 minutes. It was confirmed that pH was 7. A generated salt was removed by suction filtration. Then, the reaction solution was dropwise added to 2,500 g of methanol over 5 minutes, to obtain a solid. The solid was recovered by suction filtration and then dried with a vacuum dryer at 50° C. for 10 hours, to obtain 19.2 g of a solid matter. Functional group conversion was confirmed owing to the disappearance of the absorpt ion peak (3600 cm-1) of a phenolic hydroxyl group verified from IR analysis of the solid matter and the appearance of a peak (4.6-5.8 ppm) derived from vinyl benzyl ether verified from NMR analysis thereof. A polyvinyl benzyl ether compound (O) was thus obtained. The polyvinyl benzyl ether compound (O) was measured by a gel permeation chromatography (GPC) method. As a result, the number average molecular weight (Mn) thereof was 823, and the weight average molecular weight (Mw) thereof was 3,549.

Examples 13-18, Comparative Examples 4-5

The vinyl benzyl ether compounds (h), (i), (j), (k), (l), (m), (n) and (O) obtained in Examples 7 to 12 and Comparative Examples 2 and 3 were respectively investigated for solubility in each of toluene and methyl ethyl ketone.

in heat resistance and lower in dielectric constant and dielectric loss tangent than the different polyvinyl benzyl ether compound.

Examples 24-28, Comparative Examples 8-9

Each of the vinyl benzyl ether compounds (h), (j), (k), (l), (m) and (n) obtained in Example 7, Examples 9 to 12 Comparative Example 2, and a polyvinyl benzyl ether compound having no polyphenylene ether structure (supplied by

TABLE 1

|  |  | Ex. 13 | Ex. 14 | Ex. 15 | Ex. 16 | Ex. 17 | Ex. 18 | CEx. 4 | CEx. 5 |
|---|---|---|---|---|---|---|---|---|---|
|  | Vinyl benzyl compound | (h) | (i) | (j) | (k) | (l) | (m) | (n) | (o) |
| Solubility | 10 wt % toluene | Soluble | Soluble | Soluble | Soluble | Soluble | Soluble | Soluble | Insoluble |
|  | 30 wt % toluene | Soluble | Soluble | Soluble | Soluble | Soluble | Soluble | Soluble | Insoluble |
|  | 50 wt % toluene | Soluble | Soluble | Soluble | Soluble | Soluble | Soluble | Soluble | Insoluble |
|  | 10 wt % methyl ethyl ketone | Soluble | Soluble | Soluble | Soluble | Soluble | Soluble | Soluble | Insoluble |
|  | 30 wt % methyl ethyl ketone | Soluble | Soluble | Soluble | Soluble | Soluble | Soluble | Insoluble | Insoluble |
|  | 50 wt % methyl ethyl ketone | Soluble | Soluble | Soluble | Soluble | Soluble | Soluble | Insoluble | Insoluble |

Ex. = Example,
CEx. = Comparative Example

Table 1 shows that the polyvinyl benzyl ether compounds of the present invention were higher in solvent solubility than the bifunctional vinyl benzyl ether compound and the different polyvinyl benzyl ether compound.

Examples 19-23, Comparative Examples 6-7

Each of the vinyl benzyl ether compounds (h), (j), (k), (l), (m), (n) and (O) obtained in Example 7, Examples 9 to 12 and Comparative Examples 2 and 3 was independently temperature-increased with a vacuum press machine using a mold made of SUS to 200° C. at a rate of 3° C./min under 2 MPa and then maintained at 200° C. under 2 MPa for 3 hours to carry out pressing, whereby about-1-mm-thick resin cured products were respectively obtained. The resin cured products were measured for glass transition temperature and dielectric characteristics, whereby differences in heat resistance, dielectric constant and dielectric loss tangent were confirmed.

SHOWA HIGHPOLYMER CO., LTD.: V1100X) was independently mixed with a styrene butadiene styrene copolymer (TR2003 supplied by JSR, styrene content 43 wt %, weight average molecular weight about 100,000) in a weight ratio of vinyl benzyl ether compound:styrene butadiene styrene copolymer=50:50. The mixtures were independently dissolved in toluene, thereby preparing varnishes having a resin solid content of 30 wt %, respectively. Each of the varnishes was independently applied to a 100-μm PET film (Lumirror-T: supplied by Toray Industries, Inc.) with a doctor blade and then dried with an air-dryer at 80° C. for 5 minutes, whereby curable films each having a 30-μm-thick resin layer were respectively prepared. The curable films were evaluated for appearance. Table 3 shows the results. In regard to Comparative Example 9, cracks and clefts occurred after the solvent drying and a homogeneous coating film could not be obtained. Then, the curable films were heated up to 200° C. at a temperature-increasing rate of 4° C./min in an inert oven

TABLE 2

|  |  | Ex. 19 | Ex. 20 | Ex. 21 | Ex. 22 | Ex. 23 | CEx. 6 | CEx. 7 |
|---|---|---|---|---|---|---|---|---|
|  | Vinyl benzyl compound | (h) | (j) | (k) | (l) | (m) | (n) | (o) |
| Physical properties | Glass transition temperature (° C.) | 248 | 240 | 249 | 245 | 251 | 218 | 214 |
|  | Dielectric constant (10 GHz) | 2.46 | 2.46 | 2.50 | 2.46 | 2.48 | 2.48 | 2.60 |
|  | Dielectric loss tangent (10 GHz) | 0.0042 | 0.0043 | 0.0045 | 0.0040 | 0.0045 | 0.0035 | 0.0065 |

Ex. = Example,
CEx. = Comparative Example

Table 2 shows that the polyvinyl benzyl ether compounds of the present invention were higher in heat resistance than the bifunctional vinyl benzyl ether compound, and that the polyvinyl benzyl compounds of the present invention were higher under nitrogen and maintained under heat at 200° C. for 30 minutes. Then, the PET films were peeled off and removed from the curable films by hand, thereby obtaining films. The films each had a thickness of 30 μm. The films were measured for a glass transition temperature, a dimensional change rate, a dielectric constant and a dielectric loss tangent. Table 3 shows the results.

foil-attached curable films each having a 30-μm thick resin layer were respectively prepared. The copper-foil-attached curable films were evaluated for appearance. Table 4 shows

TABLE 3

Examples 24–28, Comparative Examples 8–9

|  | Ex. 24 | Ex. 25 | Ex. 26 | Ex. 27 | Ex. 28 | CEx. 8 | CEx. 9 |
|---|---|---|---|---|---|---|---|
| Curable resin | Resin h | Resin j | Resin k | Resin l | Resin m | Resin n | V1100X |
| Appearance of curable film | ○ | ○ | ○ | ○ | ○ | ○ | x |
| Glass transition temperature (° C.) | 195 | 193 | 199 | 198 | 187 | 162 | — |
| Dimensional change rate | 7% | 8% | 6% | 7% | 7% | 16% | — |
| Dielectric constant (10 GHz) | 2.41 | 2.42 | 2.40 | 2.42 | 2.43 | 2.40 | — |
| Dielectric loss tangent (10 GHz) | 0.0028 | 0.0029 | 0.0027 | 0.0027 | 0.0028 | 0.0025 | — |

Ex. = Example,
CEx. = Comparative Example

According to Examples 24 to 28 and Comparative Examples 8 and 9, it was found that films with no defects could be obtained owing to the phenylene ether structure. According to Examples 24 to 28 and Comparative Example 8, it was found that poly-functionalization could increase heat resistance and reduce dimensional change while low dielectric characteristics were kept.

Example 29-33, Comparative Examples 10-11

Each of the vinyl benzyl ether compounds (h), (j), (k), (l), (m) and (n) obtained in Example 7, Examples 9 to 12 Comparative Example 2, and a polyvinyl benzyl ether compound having no polyphenylene ether structure (V1100X) was independently mixed with a hydrogenated styrene butadiene styrene copolymer (SEPTON8007L supplied by Kurary Co., Ltd., styrene content 20 wt %, weight average molecular weight about 100,000) in a weight ratio of vinyl benzyl ether compound hydrogenated styrene butadiene styrene copolymer=50:50. The mixtures were independently dissolved in toluene, thereby preparing varnishes having a resin solid content of 20 wt %, respectively. Each of the varnishes was independently applied to a mat surface of a18-μm thick electrolytic copper foil (3EC-III: supplied by MITSUI MINING & SMELTING CO., LTD) with a doctor blade and then dried with an air dryer at 8,0° C. for 5 minutes, whereby copperthe results. In regard to Comparative Example 11, cracks and clefts occurred after the solvent drying and a homogeneous coating film could not be obtained. Then, the copper-foil-attached curable films were heated up to 200° C. at a temperature-increasing rate of 4° C./min in an inert oven under nitrogen and maintained under heat at 200° C. for 30 minutes. Then, the copper foils were respectively removed from the curable films by etching, thereby obtaining films. The films each had a thickness of 30 μm. The films were measured for a glass transition temperature, a dimensional change rate, a dielectric constant and a dielectric loss tangent. Table 4 shows the results.

TABLE 4

Examples 29–33, Comparative Examples 10–11

|  | Ex. 29 | Ex. 30 | Ex. 31 | Ex. 32 | Ex. 33 | CEx. 10 | CEx. 11 |
|---|---|---|---|---|---|---|---|
| Curable resin | Resin h | Resin j | Resin k | Resin l | Resin m | Resin n | V1100X |
| Appearance of curable film | ○ | ○ | ○ | ○ | ○ | ○ | x |
| Glass transition temperature (° C.) | 197 | 196 | 197 | 200 | 214 | 183 | — |
| Dimensional change rate | 6% | 7% | 6% | 6% | 8% | 28% | — |
| Dielectric constant (10 GHz) | 2.35 | 2.33 | 2.36 | 2.36 | 2.34 | 2.33 | — |
| Dielectric loss tangent (10 GHz) | 0.0018 | 0.0019 | 0.0020 | 0.0019 | 0.0021 | 0.0018 | — |

Ex. = Example,
CEx. = Comparative Example

According to Example 29 to 33 and Comparative Examples 10 to 11, it was found that films with no defects could be obtained owing to the phenylene ether structure. According to Examples 29 to 33 and Comparative Example 10, it was found that poly-functionalization could increase heat resistance and reduce dimensional change while low dielectric characteristics were kept.

Example 34

The copper-foil-attached curable film obtained in Example 33 was placed on each surface of a core material having patterns of line/space=100 μm/100 μm on its both surfaces (EL190, copper foil thickness 18 μm, supplied by Mitsubishi Gas Chemical Company, Inc.), and the resultant set was cured under heat at 200° C. under a pressure of 2 MPa for 2 hours, to produce a four-layered board. The copper foil peeling strength of the eternal layers was evaluated in accordance with JIS C6481. As a result thereof, it was 0.8 kN/m. Further, the copper foils were removed by etching, and embedding properties of the patterns were investigated. The inner-layer patterns were embedded without any void.

Example 35

Synthesis of Polyfunctional Epoxy Resin (p)

160 g (hydroxyl group 0.258 mol) of the toluene solution of the polyfunctional phenylene ether oligomer (a), obtained in Example 1, and 639 g (6.91 mol) of epichlorohydrin were added to a 2-liter rounded reactor equipped with a magnetic stirrer, a Dimroth condenser and a thermometer. The atmosphere in the reactor was replaced with nitrogen. Then, the mixture was stirred at a reaction temperature of 85° C. 105 g (0.310 mol) of an ethanol solution of 20 wt % of sodium ethoxide was filled into a drop funnel, and it was dropwise added to the reactor over 60 minutes with stirring. After the completion of the dropwise addition, the mixture was allowed to react at 85° C. for 240 minutes with stirring. After the completion of the reaction, the reaction solution was allowed to stand until its temperature decreased to 60° C. 250 g of 50° C.-hot pure water was added to the reaction solution. Liquid-separation operation was repeated four times until the pH of an aqueous phase became 7. An organic phase was concentrated with an evaporator, to obtain 195 g of a concentrated solution. The concentrated solution was diluted with 40 g of methanol, and the diluted solution was dropwise added to a mixed solution of 1,000 g of methanol and 1,000 g of pure water with stirring, thereby precipitating a solid. The solid was recovered by filtration with a Buchner funnel. The solid was washed with a mixed solvent of 100 g of methanol and 100 g of pure water by stirring for 5 minutes. Filtration was carried out under the same conditions. The solid was washed two times, and then the solid was dried with a vacuum dryer, to obtain 65 g of a polyfunctional epoxy resin (p). The polyfunctional epoxy resin (p) was measured by a gel permeation chromatography (GPC) method. As a result, the number average molecular weight (Mn) thereof was 1,061, and the weight average molecular weight (Mw) thereof was 1,617. Functional group conversion was confirmed owing to the disappearance of the absorption peak (3600 cm-1) of a phenolic hydroxyl group verified from IR analysis and the appearance of a peak derived from glycidyl ether verified from NMR analysis. Further, the epoxy equivalent thereof was 425 g/eq.

Example 36

Synthesis of Polyfunctional Epoxy Resin (q)

160 g (hydroxyl group 0.260 mol) of the toluene solution of the polyfunctional phenylene ether oligomer (b), obtained in Example 2, and 642 g (6.92 mol) of epichlorohydrin were added to a 2-liter rounded reactor equipped with a magnetic stirrer, a Dimroth condenser and a thermometer. The atmosphere in the reactor was replaced with nitrogen. Then, the mixture was stirred at a reaction temperature of 85° C. 105 g (0.310 mol) of an ethanol solution of 20 wt % of sodium ethoxide was filled into a drop funnel, and it was dropwise added to the reactor over 60 minutes with stirring. After the completion of the dropwise addition, the mixture was allowed to react at 85° C. for 240 minutes with stirring. After the completion of the reaction, the reaction solution was allowed to stand until its temperature decreased to 60° C. 250 g of 50° C.-hot pure water was added to the reaction solution. Liquid-separation operation was repeated four times until the pH of an aqueous phase became 7. An organic phase was concentrated with an evaporator, to obtain 200 g of a concentrated solution. The concentrated solution was diluted with 40 g of methanol, and the diluted solution was dropwise added to a mixed solution of 1,000 g of methanol and 1,000 g of pure water with stirring, thereby precipitating a solid. The solid was recovered by filtration with a Buchner funnel. The solid was washed with a mixed solvent of 100 g of methanol and 100 g of pure water by stirring for 5 minutes. Filtration was carried out under the same conditions. The solid was washed two times, and then the solid was dried with a vacuum dryer, to obtain 66 g of a resin (q). The resin (q) was measured by a gel permeation chromatography (GPC) method. As a result, the number average molecular weight (Mn) thereof was 1,050, and the weight average molecular weight (Mw) thereof was 1,613. Functional group conversion was confirmed owing to the disappearance of the absorption peak (3600 cm-1) of a phenolic hydroxyl group verified from IR analysis and the appearance of a peak derived from glycidyl ether verified from NMR analysis. Further, the epoxy equivalent thereof was 430 g/eq.

Example 37

Synthesis of Polyfunctional Epoxy Resin (r)

133.3 g (hydroxyl group 0.248 mol) of the toluene solution of the polyfunctional phenylene ether oligomer (c), obtained in Example 3, 26.7 g of toluene and 615 g (6.65 mol) of epichlorohydrin were added to a 2-liter rounded reactor equipped with a magnetic stirrer, a Dimroth condenser and a thermometer. The atmosphere in the reactor was replaced with nitrogen. Then, the mixture was stirred at a reaction temperature of 85° C. 101 g (0.298 mol) of an ethanol solution of 20 wt % of sodium ethoxide was filled into a drop funnel, and it was dropwise added to the reactor over 60 minutes with stirring. After the completion of the dropwise addition, the mixture was allowed to react at 85° C. for 240 minutes with stirring. After the completion of the reaction, the reaction solution was allowed to stand until its temperature decreased to 60° C. 250 g of 50° C.-hot pure water was added to the reaction solution. Liquid-separation operation was repeated four times until the pH of an aqueous phase became 7. An organic phase was concentrated with an evaporator, to obtain 190 g of a concentrated solution. The concentrated solution was diluted with 40 g of methanol, and the diluted solution was dropwise added to a mixed solution of 1,000 g of methanol and 1,000 g of pure water with stirring, thereby precipitating a solid. The solid was recovered by filtration with a Buchner funnel. The solid was washed with a mixed solvent of 100 g of methanol and 100 g of pure water by stirring for 5 minutes. Filtration was carried out under the same conditions. The solid was washed two times, and then the solid was dried with a vacuum dryer, to obtain 57 g of a polyfunctional epoxy resin (r). The polyfunctional epoxy resin (r) was measured by a gel permeation chromatography (GPC) method. As a result, the number average molecular weight (Mn) thereof was 1,003, and the weight average molecular weight (Mw) thereof was 1,598. Functional group conversion was confirmed owing to the disappearance of the absorption peak (3600 cm-1) of a phenolic hydroxyl group verified from IR analysis and the appearance of a peak derived from glycidyl ether verified from NMR analysis. Further, the epoxy equivalent thereof was 418 g/eq.

Example 38

Synthesis of Polyfunctional Epoxy Resin (s)

129 g (hydroxyl group 0.239 mol) of the toluene solution of the polyfunctional phenylene ether oligomer (d), obtained in Example 4, 31.0 g of toluene and 592 g (6.40 mol) of epichlorohydrin were added to a 2-liter rounded reactor equipped with a magnetic stirrer, a Dimroth condenser and a thermometer. The atmosphere in the reactor was replaced with nitrogen. Then, the mixture was stirred at a reaction temperature of 85° C. 97.6 g (0.287 mol) of an ethanol solution of 20 wt % of sodium ethoxide was filled into a drop funnel, and it was dropwise added to the reactor over 60 minutes with stirring. After the completion of the dropwise addition, the mixture was allowed to react at 85° C. for 240 minutes with stirring. After the completion of the reaction, the reaction solution was allowed to stand until its temperature decreased to 60° C. 250 g of 50° C.-hot pure water was added to the reaction solution. Liquid-separation operation was repeated four times until the pH of an aqueous phase became 7. An organic phase was concentrated with an evaporator, to obtain 190 g of a concentrated solution. The concentrated solution was diluted with 40 g of methanol, and the diluted solution was dropwise added to a mixed solution of 1,000 g of methanol and 1,000 g of pure water with stirring, thereby precipitating a solid. The solid was recovered by filtration with a Buchner funnel. The solid was washed with a mixed solvent of 100 g of methanol and 100 g of pure water by stirring for 5 minutes. Filtration was carried out under the same conditions. The solid was washed two times, and then the solid was dried with a vacuum dryer, to obtain 66 g of a polyfunctional epoxy resin (s). The polyfunctional epoxy resin (s) was measured by a gel permeation chromatography (GPC) method. As a result, the number average molecular weight (Mn) thereof was 1,096, and the weight average molecular weight (Mw) thereof was 1,573. Functional group conversion was confirmed owing to the disappearance of the absorption peak (3600 cm-1) of a phenolic hydroxyl group verified from IR analysis and the appearance of a peak derived from glycidyl ether verified from NMR analysis. Further, the epoxy equivalent thereof was 430 g/eq.

Example 39

Synthesis of Polyfunctional Epoxy Resin (t)

129.0 g (hydroxyl group 0.239 mol) of the toluene solution of the polyfunctional phenylene ether oligomer (e), obtained in Example 5, 31.0 g of toluene and 608 g (6.57 mol) of epichlorohydrin were added to a 2-liter rounded reactor equipped with a magnetic stirrer, a Dimroth condenser and a thermometer. The atmosphere in the reactor was replaced with nitrogen. Then, the mixture was stirred at a reaction temperature of 85° C. 100 g (0.294 mol) of an ethanol solution of 20 wt % of sodium ethoxide was filled into a drop funnel, and it was dropwise added to the reactor over 60 minutes with stirring. After the completion of the dropwise addition, the mixture was allowed to react at 85° C. for 240 minutes with stirring. After the completion of the reaction, the reaction solution was allowed to stand until its temperature decreased to 60° C. 250 g of 50° C.-hot pure water was added to the reaction solution. Liquid-separation operation was repeated four times until the pH of an aqueous phase became 7. An organic phase was concentrated with an evaporator, to obtain 190 g of a concentrated solution. The concentrated solution was diluted with 40 g of methanol, and the diluted solution was dropwise added to a mixed solution of 1,000 g of methanol and 1,000 g of pure water with stirring, thereby precipitating a solid. The solid was recovered by filtration with a Buchner funnel. The solid was washed with a mixed solvent of 100 g of methanol and 100 g of pure water by stirring for 5 minutes. Filtration was carried out under the same conditions. The solid was washed two times, and then the solid was dried with a vacuum dryer, to obtain 53 g of a polyfunctional epoxy resin (t). The polyfunctional epoxy resin (t) was measured by a gel permeation chromatography (GPC) method. As a result, the number average molecular weight (Mn) thereof was 1,068, and the weight average molecular weight (Mw) thereof was 1,540. Functional group conversion was confirmed owing to the disappearance of the absorption peak (3600 cm-1) of a phenolic hydroxyl group verified from IR analysis and the appearance of a peak derived from glycidyl ether verified from NMR analysis. Further, the epoxy equivalent thereof was 435 g/eq.

Example 40

Synthesis of Polyfunctional Epoxy Resin (u)

200 g (hydroxyl group 0.242 mol) of the toluene solution of the polyfunctional phenylene ether oligomer (f), obtained in Example 6, and 600 g (6.48 mol) of epichlorohydrin were added to a 2-liter rounded reactor equipped with a magnetic stirrer, a Dimroth condenser and a thermometer. The atmosphere in the reactor was replaced with nitrogen. Then, the mixture was stirred at a reaction temperature of 85° C. 99 g (0.290 mol) of an ethanol solution of 20 wt % of sodium ethoxide was filled into a drop funnel, and it was dropwise added to the reactor over 60 minutes with stirring. After the completion of the dropwise addition, the mixture was allowed to react at 85° C. for 240 minutes with stirring. After the completion of the reaction, the reaction solution was allowed to stand until its temperature decreased to 60° C. 250 g of 50° C.-hot pure water was added to the reaction solution. Liquid-separation operation was repeated four times until the pH of an aqueous phase became 7. An organic phase was concentrated with an evaporator, to obtain 220 g of a concentrated solution. The concentrated solution was diluted with 40 g of methanol, and the diluted solution was dropwise added to a mixed solution of 1,000 g of methanol and 1,000 g of pure water with stirring, thereby precipitating a solid. The solid was recovered by filtration with a Buchner funnel. The solid was washed with a mixed solvent of 100 g of methanol and 100 g of pure water by stirring for 5 minutes. Filtration was carried out under the same conditions. The solid was washed two times, and then the solid was dried with a vacuum dryer, to obtain 103 g of a polyfunctional epoxy resin (u). The polyfunctional epoxy resin (u) was measured by a gel permeation chromatography (GPC) method. As a result, the number average molecular weight (Mn) thereof was 2,097, and the weight average molecular weight (Mw) thereof was 2,969. Functional group conversion was confirmed owing to the disappearance of the absorption peak (3600 cm-1) of a phenolic hydroxyl group verified from IR analysis and the appearance of a peak derived from glycidyl ether verified from NMR analysis. Further, the epoxy equivalent thereof was 505 g/eq.

Comparative Example 12

Synthesis of Bifunctional Epoxy Resin (v)

2.14 g (9.58 mmol) of $CuBr_2$, 0.699 g (4.05 mmol) of di-tert-butylethylenediamine, 21.4 g (211 mmol) of butyldimethylamine, 0.7 g (1.73 mmol) of trioctyl methyl ammonium chloride and 2,600 g of toluene were charged into a 12-liter longitudinally-long reactor equipped with a stirrer, a thermometer, an air-introducing tube and baffleplates. The mixture was stirred at a reaction temperature of 41° C. Separately, 130 g (0.480 mol) of 2,2',3,3',5,5'-hexamethyl-4,4'- biphenol, 291 g (2.39 mol) of 2,6-dimethylphenol, 1.75 g (7.85 mmol) of $CuBr_2$, 0.572 g (3.32 mmol) of di-tert-butyl-ethylenediamine and 17.5 g (173 mmol) of butyldimethylamine were dissolved in 2,250 g of methanol in advance, to prepare a mixed solution (dihydric phenol:monohydric phenol molar ratio, 1:5). The mixed solution was heated to 50° C. and dropwise added to the mixture in the reactor over 230 minutes with stirring at 1020 rpm while carrying out bubbling with a mixed gas (oxygen concentration 8.0%) of 2.1 L/min of air and 3.2 L/min of nitrogen. After the completion of the addition, the gas bubbling was terminated. An aqueous solution of 23.7 g (52.3 mmol) of tetrasodium ethylenediamine tetraacetate in 1,500 g of pure water was added to the mixture, and the resultant mixture was stirred at 600 rpm for 30 minutes, to terminate the reaction. Then, the reaction mixture was once washed with pure water, to obtain a solution. The thus-obtained solution was concentrated with an evaporator, to obtain 630 g of a 65 wt % toluene solution of a bifunctional phenylene ether oligomer. The thus-obtained bifunctional phenylene ether oligomer was measured by a gel permeation chromatography (GPC) method. As a result, the number average molecular weight (Mn) thereof was 1,115, and the weight average molecular weight (Mw) thereof was 1,717. According to NMR and FDMS analyses, the generation was confirmed. The hydroxyl group equivalent of the solution was 755 g/eq.

Then, 123.1 g (hydroxyl group 0.163 mol) of the toluene solution (65%) of the above-obtained bifunctional phenylene ether oligomer, 26.9 g of toluene and 404 g (4.37 mol) of epichlorohydrin were added to a 2-liter rounded reactor equipped with a magnetic stirrer, a Dimroth condenser and a thermometer. The atmosphere in the reactor was replaced with nitrogen. Then, the mixture was stirred at a reaction temperature of 85° C. 66.6 g (0.196 mol) of an ethanol solution of 20 wt % of sodium ethoxide was filled into a drop funnel, and it was dropwise added to the reactor over 60 minutes with stirring. After the completion of the dropwise addition, the mixture was allowed to react at 85° C. for 240 minutes with stirring. After the completion of the reaction, the reaction solution was allowed to stand until its temperature decreased to 60° C. 250 g of 50° C.-hot pure water was added to the reaction solution. Liquid-separation operation was repeated five times until the pH of an aqueous phase became 7. An organic phase was concentrated with an evaporator, to obtain 180 g of a concentrated solution. The concentrated solution was diluted with 40 g of methanol, and the diluted solution was dropwise added to a mixed solution of 1,000 g of methanol and 1,000 g of pure water with stirring, thereby precipitating a solid. The solid was recovered by filtration with a Buchner funnel. The solid was washed with a mixed solvent of 100 g of methanol and 100 g of pure water by stirring for 5 minutes. Filtration was carried out under the same conditions. The solid was washed two times, and then the solid was dried with a vacuum dryer, to obtain 85 g of a bifunctional epoxy resin (v). The bifunctional epoxy resin (v) was measured by a gel permeation chromatography (GPC) method. As a result, the number average molecular weight (Mn) thereof was 1,122, and the weight average molecular weight (Mw) thereof was 2,020. Functional group conversion was confirmed owing to the disappearance of the absorption peak (3600 cm-1) of a phenolic hydroxyl group verified from IR analysis and the appearance of a peak derived from glycidyl ether verified from NMR analysis. Further, the epoxy equivalent thereof was 575 g/eq.

Examples 41-46, Comparative Example 13

Each of the polyfunctional epoxy resins (p), (q), (r), (s), (t) and (u) and the bifunctional epoxy resin (v), obtained in Examples 35 to 40 and Comparative Example 12, was independently mixed with a phenol novolak resin (TD2131, supplied by DAINIPPON INK AND CHEMICALS, INCORPORATED) as a curing agent and triphenyl phosphine (reagent, supplied by Tokyo Chemical Industry Co., Ltd.) as a curing accelerator in a weight ratio shown in Table 5. The mixtures each were independently dissolved in methyl ethyl ketone, to prepare varnishes having a resin content of 50 wt %, respectively. Each of the varnishes was independently applied to a KAPTON film (KAPTON 200H, supplied by Du PONT-TORAY Co., Ltd.) with a bar coater, treated with an air-dryer at 120° C. for 3 minutes and then scraped out, thereby obtaining powders respectively. The powders were dried with a vacuum dryer at 30° C. for 20 hours. Then, each of the powders was independently temperature-increased with a vacuum press machine using a mold made of SUS to 180° C. at a rate of 3° C./min under 2 MPa and then pressed at 180° C. under 2 MPa for 1 hour, thereby preparing resin cured products, respectively. At the same time, after the 180-° C. 1-hour pressing, the resin cured products were after-cured at 180° C. for 9 hours, thereby obtaining resin cured products.

The resin cured products were measured for breaking strength and differences in reactivity were confirmed.

TABLE 5

| | | Ex. 41 | Ex. 42 | Ex. 43 | Ex. 44 | Ex. 45 | Ex. 46 | CEx. 13 |
|---|---|---|---|---|---|---|---|---|
| Epoxy resin | Resin (p) (Example 35) | 100 | | | | | | |
| | Resin (q) (Example 36) | | 100 | | | | | |
| | Resin (r) (Example 37) | | | 100 | | | | |
| | Resin (s) (Example 38) | | | | 100 | | | |
| | Resin (t) (Example 39) | | | | | 100 | | |
| | Resin (u) (Example 40) | | | | | | 100 | |
| | Resin (v) (Comparative Example 12) | | | | | | | 100 |
| Curing agent | Phenol Novolak | 24 | 24 | 24 | 25 | 24 | 20 | 18 |
| Curing accelerator | Triphenyl phosphine | 0.5 | 0.5 | 0.5 | 0.5 | 0.5 | 0.25 | 0.5 |
| Physical properties | Breaking strength (N/mm2) (not after-cured) | 131 | 130 | 125 | 133 | 117 | 107 | 26 |
| | Breaking strength (N/mm2) (after-cured) | 123 | 121 | 126 | 129 | 126 | 122 | 100 |

Ex. = Example,
CEx. = Comparative Example

Table 5 shows that the polyfunctional epoxy resins of the present invention were higher in reactivity than the bifunctional epoxy resin.

Examples 47-52, Comparative Example 14

Each of the polyfunctional epoxy resins (p), (q), (r), (s), (t) and (u) and the bifunctional epoxy resin (v), obtained in Examples 35 to 40 and Comparative Example 12, was independently mixed with 2-ethyl-4-methylimidazole (2E4MZ, supplied by Shikoku Chemicals Corporation) as a curing agent in a weight ratio shown in Table 6. The mixtures were respectively measured for gelation time, and differences in reactivity were confirmed.

epoxy resin (v), obtained in Comparative Example 12, a phenol novolak type epoxy resin (N770, supplied by DAINIPPON INK AND CHEMICALS, INCORPORATED) and a dicyclopentadiene novolak type epoxy resin (HP7200H, supplied by DAINIPPON INK AND CHEMICALS, INCORPORATED) was independently mixed with a phenol novolak resin (TD2131) as a curing agent and triphenyl phosphine (reagent) as a curing accelerator in a weight ratio shown in Table 7. The mixtures each were independently dissolved in methyl ethyl ketone, to prepare varnishes having a resin content of 50 wt %, respectively. Each of the varnishes was independently applied to a KAPTON film (KAPTON 200H) with a bar coater, treated with an air-dryer at 120° C. for 3 minutes, and then scraped out, thereby obtaining powders

TABLE 6

| | | Ex. 47 | Ex. 48 | Ex. 49 | Ex. 50 | Ex. 51 | Ex. 52 | CEx. 14 |
|---|---|---|---|---|---|---|---|---|
| Epoxy resin | Resin (p) (Example 35) | 100 | | | | | | |
| | Resin (q) (Example 36) | | 100 | | | | | |
| | Resin (r) (Example 37) | | | 100 | | | | |
| | Resin (s) (Example 38) | | | | 100 | | | |
| | Resin (t) (Example 39) | | | | | 100 | | |
| | Resin (u) (Example 40) | | | | | | 100 | |
| | Resin (v) (Comparative Example 12) | | | | | | | 100 |
| Curing agent | 2-ethyl-4-methylimidazole | 4 | 4 | 4 | 4 | 4 | 4 | 4 |
| Physical properties | Gelation time (160° C.) | 246 s | 250 s | 266 s | 303 s | 303 s | 110 s | >600 s |

Ex. = Example,
CEx. = Comparative Example

Table 6 shows that the polyfunctional epoxy resins of the present invention were higher in reactivity than the bifunctional epoxy resin.

Examples 53-58, Comparative Examples 15-17

Each of the polyfunctional epoxy resins (p), (q), (r), (s), (t) and (u), obtained in Examples 35 to 40, the bifunctional respectively. The powders were dried with a vacuum dryer at 30° C. for 20 hours. Then, each of the powders was independently temperature-increased with a vacuum press machine using a mold made of SUS to 180° C. at a rate of 3° C./min under 2 MPa, then pressed at 180° C. under 2 MPa for 1 hour, and then after-cured at 180° C. for 9 hours. Then, the thus-obtained cured products were measured for glass transition temperature and dielectric characteristics, and differences in dielectric constant, dielectric loss tangent and heat resistance were confirmed.

TABLE 7

| | | Ex. 53 | Ex. 54 | Ex. 55 | Ex. 56 | Ex. 57 | Ex. 58 | CEx. 15 | CEx. 16 | CEx. 17 |
|---|---|---|---|---|---|---|---|---|---|---|
| Epoxy resin | Resin (p) (Example 35) | 100 | | | | | | | | |
| | Resin (q) (Example 36) | | 100 | | | | | | | |
| | Resin (r) (Example 37) | | | 100 | | | | | | |
| | Resin (s) (Example 38) | | | | 100 | | | | | |
| | Resin (t) (Example 39) | | | | | 100 | | | | |
| | Resin (u) (Example 40) | | | | | | 100 | | | |
| | Resin (v) (Comparative Example 12) | | | | | | | 100 | | |
| | Phenol novolak type epoxy | | | | | | | | 100 | |
| | Dicyclopentadiene novolak type epoxy | | | | | | | | | 100 |
| Curing agent | Phenol Novolak | 24 | 24 | 24 | 25 | 24 | 20 | 18 | 54 | 37 |
| Curing accelerator | Triphenyl phosphine | 0.5 | 0.5 | 0.5 | 0.5 | 0.5 | 0.25 | 0.5 | 1.5 | 0.5 |
| Physical properties | Glass transition temperature (DMA E″ peak top) | 177° C. | 175° C. | 172° C. | 186° C. | 177° C. | 178° C. | 166° C. | 183° C. | 158° C. |

TABLE 7-continued

|  | Ex. 53 | Ex. 54 | Ex. 55 | Ex. 56 | Ex. 57 | Ex. 58 | CEx. 15 | CEx. 16 | CEx. 17 |
|---|---|---|---|---|---|---|---|---|---|
| Dielectric constant (10 GHz) | 2.74 | 2.71 | 2.72 | 2.73 | 2.76 | 2.81 | 2.67 | 3.03 | 2.89 |
| Dielectric loss tangent (10 GHz) | 0.024 | 0.023 | 0.025 | 0.023 | 0.026 | 0.033 | 0.021 | 0.036 | 0.034 |

Ex. = Example,
CEx. = Comparative Example

Table 7 shows that, when the phenol novolak resin was used as a curing agent, the polyfunctional epoxy resins of the present invention were higher in heat resistance than the bifunctional epoxy resin and were lower in dielectric constant and dielectric loss tangent than the different polyfunctional epoxy resins.

Examples 59-62, Comparative Examples 18-19

Each of the polyfunctional epoxy resins (p), (r), (s) and (t), obtained in Examples 35, 37 to 39, a phenol novolak type epoxy resin (N770) and a dicyclopentadiene novolak type epoxy resin (HP7200H) was independently mixed with a phenyl phenol aralkyl resin (XLC-LL, supplied by Mitsui Chemicals, Inc.) as a curing agent and triphenyl phosphine (reagent) as a curing accelerator in a weight ratio shown in Table 8. The mixtures each were independently dissolved in methyl ethyl ketone, to prepare varnishes having a resin content of 50 wt %, respectively. Each of the varnishes was independently applied to a KAPTON film (KAPTON 200H) with a bar coater, treated with an air-dryer at 120° C. for 3 minutes and then scraped out, thereby obtaining powders respectively. The powders were dried with a vacuum dryer at 30° C. for 20 hours. Then, the powders were respectively temperature-increased with a vacuum press machine using a mold made of SUS to 180° C. at a rate of 3° C./min under 2 MPa, then pressed at 180° C. under 2 MPa for 1 hour, and then after-cured at 180° C. for 9 hours. Then, the thus-obtained cured products were measured for glass transition temperature and dielectric characteristics, and differences in dielectric constant, dielectric loss tangent and heat resistance were confirmed.

TABLE 8

|  |  | Ex. 59 | Ex. 60 | Ex. 61 | Ex. 62 | CEx. 18 | CEx. 19 |
|---|---|---|---|---|---|---|---|
| Epoxy resin | Resin (p) (Example 35) | 100 |  |  |  |  |  |
|  | Resin (r) (Example 37) |  | 100 |  |  |  |  |
|  | Resin (s) (Example 38) |  |  | 100 |  |  |  |
|  | Resin (t) (Example 39) |  |  |  | 100 |  |  |
|  | Phenol novolak type epoxy |  |  |  |  | 100 |  |
|  | Dicyclopentadiene novolak type epoxy |  |  |  |  |  | 100 |
| Curing agent | Phenyl phenol aralkyl | 42 | 43 | 41 | 43 | 93 | 63 |
| Curing accelerator | Triphenyl phosphine | 0.5 | 0.5 | 0.5 | 0.5 | 1.5 | 0.5 |
| Physical properties | Glass transition temperature (DMA E″ peak top) | 165° C. | 164° C. | 172° C. | 169° C. | 144° C. | 140° C. |
|  | Dielectric constant (10 GHz) | 2.74 | 2.76 | 2.74 | 2.77 | 2.98 | 2.87 |
|  | Dielectric loss tangent (10 GHz) | 0.023 | 0.022 | 0.024 | 0.024 | 0.033 | 0.030 |

Ex. = Example,
CEx. = Comparative Example

Table 8 shows that, when the phenyl phenol aralkyl resin was used as a curing agent, the polyfunctional epoxy resins of the present invention were higher in heat resistance and were lower in dielectric constant and dielectric loss tangent than the different polyfunctional epoxy resins.

What is claimed is:

1. A polyvinyl benzyl ether compound (C) obtained by vinyl-benzylating a phenolic hydroxyl group of a polyfunctional phenylene ether oligomer (B) having 3 to less than 9 phenolic hydroxyl groups, the polyfunctional phenylene ether oligomer (B) being obtained by reacting a polyfunctional phenol (A) having 3 to less than 9 phenolic hydroxyl groups per molecule and having two groups which are the same or different and are selected from the group consisting of an alkyl group and an alkylene group at 2-and 6-positions of at least one of the 3 to less than 9 phenolic hydroxyl groups with a monohydric phenol compound represented by the formula (1),

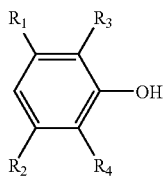
(1)

wherein $R_1$ and $R_2$ are the same or different and represent a hydrogen atom, a halogen atom, an alkyl group having 6 or less carbon atoms or a phenyl group, and $R_3$ and $R_4$ are the same or different and represent a halogen atom, an alkyl group having 6 or less carbon atoms or a phenyl group, and wherein the polyfunctional phenol (A) is at least one compound selected from the group consisting of a compound represented by the formula (4), a compound represented by the formula (5) and a compound represented by the formula (7),

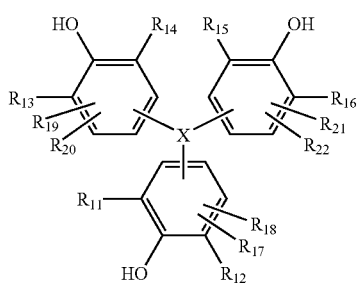
(4)

wherein X is a hydrocarbon having 1 carbon atom, $R_{11}$ and $R_{12}$ are the same or different and represent an alkyl group having 6 or less carbon atoms, $R_{13}$, $R_{14}$, $R_{15}$ and $R_{16}$ are the same or different and represent a hydrogen atom, a halogen atom, an alkoxy group, an alkyl group having 6 or less carbon atoms or a phenyl group, and $R_{17}$, $R_{18}$, $R_{19}$, $R_{20}$, $R_{21}$ and $R_{22}$ are the same or different and represent a hydrogen atom, an alkoxy group, an alkyl group having 6 or less carbon atoms or a phenyl group,

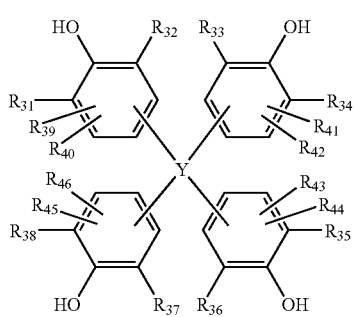
(5)

wherein Y is a hydrocarbon having 1 to 20 carbon atoms, $R_{31}$ and $R_{32}$ are the same or different and represent an alkyl group having 6 or less carbon atoms, $R_{33}$, $R_{34}$, $R_{35}$, $R_{36}$, $R_{37}$ and $R_{38}$ are the same or different and represent a hydrogen atom, a halogen atom, an alkoxy group, an alkyl group having 6 or less carbon atoms or a phenyl group, and $R_{39}$, $R_{40}$, $R_{41}$, $R_{42}$, $R_{43}$, $R_{44}$, $R_{45}$ and $R_{46}$ are the same or different and represent a hydrogen atom, an alkoxy group, an alkyl group having 6 or less carbon atoms or a phenyl group,

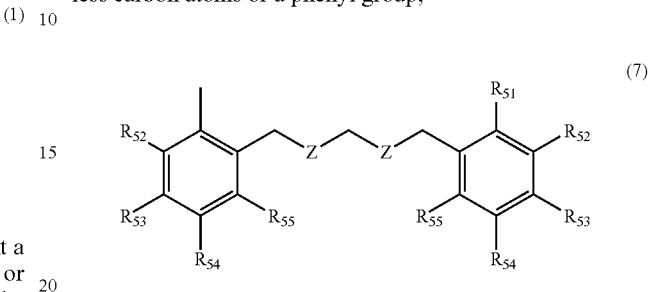
(7)

wherein Z is a phenylene group which has a hydroxyl group at least one position and may have substituent(s) at other positions, at least one of $R_{51}$, $R_{53}$ and $R_{55}$ represents a hydroxyl group and the others each represent a hydrogen atom, an alkoxy group, an alkyl group having 6 or less carbon atoms or a phenyl group, and each of $R_{52}$ and $R_{54}$ represents a hydrogen atom, an alkyl group having 6 or less carbon atoms or a phenyl group, provided that two groups which are the same or different and are selected from the group consisting of an alkyl group and an alkylene group are present at 2- and 6-positions of at least one hydroxyl group in a molecule.

2. The polyvinyl benzyl ether compound (C) according to claim 1, wherein the polyfunctional phenylene ether oligomer (B) has a number average molecular weight of 700 to 3,000 as polystyrene.

3. The polyvinyl benzyl ether compound (C) according to claim 1, wherein the monohydric phenol compound represented by the formula (1) is a compound of the formula (2),

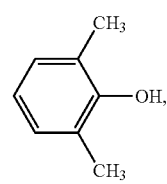
(2)

a compound of the formula (3),

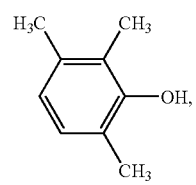
(3)

or a mixture of compounds of the formula (2) and the formula (3).

4. An aromatic vinylic curable resin composition containing the polyvinyl benzyl ether compound (C) as defined in claim 1.

5. An aromatic vinylic cured product obtained by curing the curable resin composition as defined in claim 4.

6. The aromatic vinylic curable resin composition according to claim 4, which further contains a styrenic thermoplastic elastomer (D).

7. The aromatic vinylic curable resin composition according to claim 6, wherein the styrenic thermoplastic elastomer (D) has a weight average molecular weight of 30,000 to 300,000 as polystyrene.

8. The aromatic vinylic curable resin composition according to claim 6, wherein the styrenic thermoplastic elastomer (D) has a styrene content of 20 to 49% by weight.

9. A curable film obtained by processing the aromatic vinylic curable resin composition as defined in claim 6 into a film form.

10. A cured film obtained by curing the curable film as defined in claim 9.

11. A conductor-layer-formed curable film obtained by forming a conductor layer on at least one surface of the curable film as defined in claim 9.

12. A conductor-layer-formed cured film obtained by curing the conductor-layer-formed curable film as defined in claim 11.

13. A polyfunctional epoxy resin (E) obtained by glycidylating a phenolic hydroxyl group of a polyfunctional phenylene ether oligomer (B) having 3 to less than 9 phenolic hydroxyl groups, the polyfunctional phenylene ether oligomer (B) being obtained by reacting a polyfunctional phenol (A) having 3 to less than 9 phenolic hydroxyl groups per molecule and having two groups which are the same or different and are selected from the group consisting of an alkyl group and an alkylene group at 2- and 6-positions of at least one of the 3 to less than 9 phenolic hydroxyl groups with a monohydric phenol compound represented by the formula (1)

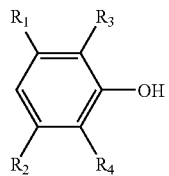
(1)

wherein $R_1$ and K are the same or different and represent a hydrogen atom, a halogen atom, an alkyl group having 6 or less carbon atoms or a phenyl group, and $R_3$ and $R_4$ are the same or different and represent a halogen atom, an alkyl group having 6 or less carbon atoms or a phenyl group, and wherein the polyfunctional phenol (A) is at least one compound selected from the group consisting of a compound represented by the formula (4), a compound represented by the formula (5) and a compound represented by the formula (7),

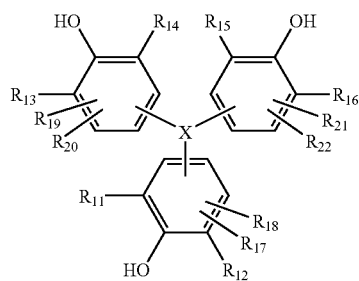
(4)

wherein X is a hydrocarbon having 1 carbon atom, $R_{11}$ and $R_{12}$ are the same or different and represent an alkyl group having 6 or less carbon atoms, $R_{13}$, $R_{14}$, $R_{15}$ and $R_{16}$ are the same or different and represent a hydrogen atom, a halogen atom, an alkoxy group, an alkyl group having 6 or less carbon atoms or a phenyl group, and $R_{17}$, $R_{18}$, $R_{19}$, $R_{20}$, $R_{21}$ and $R_{22}$ are the same or different and represent a hydrogen atom, an alkoxy group, an alkyl group having 6 or less carbon atoms or a phenyl group,

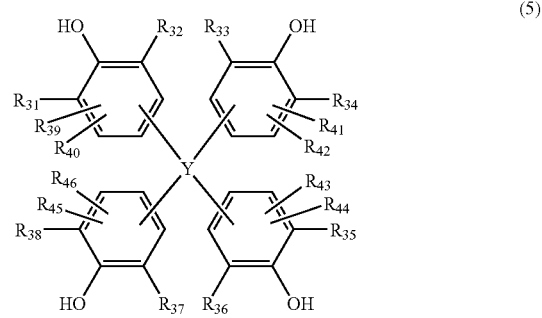
(5)

wherein Y is a hydrocarbon having 1 to 20 carbon atoms, $R_{31}$ and $R_{32}$ are the same or different and represent an alkyl group having 6 or less carbon atoms, $R_{33}$, $R_{34}$, $R_{35}$, $R_{36}$, $R_{37}$ and $R_{38}$ are the same or different and represent a hydrogen atom, a halogen atom, an alkoxy group, an alkyl group having 6 or less carbon atoms or a phenyl group, and $R_{39}$, $R_{40}$, $R_{41}$, $R_{42}$, $R_{43}$, $R_{44}$, $R_{45}$ and $R_{46}$ are the same or different and represent a hydrogen atom, an alkoxy group, an alkyl group having 6 or less carbon atoms or a phenyl group,

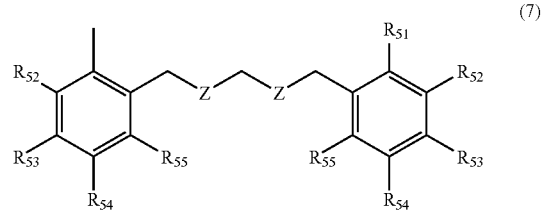
(7)

wherein Z is a phenylene group which has a hydroxyl group at least one position and may have substituent(s) at other positions, at least one of $R_{51}$, $R_{53}$ and $R_{55}$ represents a hydroxyl group and the others each represent a hydrogen atom, an alkoxy group, an alkyl group having 6 or less carbon atoms or a phenyl group, and each of $R_{52}$ and $R_{54}$ represents a hydrogen atom, an alkyl group having 6 or less carbon atoms or a phenyl group, provided that two groups which are the same or different and are selected from the group consisting of an alkyl group and an alkylene group are present at 2- and 6-positions of at least one hydroxyl group in a molecule.

14. The polyfunctional epoxy resin (E) according to claim 13, wherein the polyfunctional phenylene ether oligomer (B) has a number average molecular weight of 700 to 3,000 as polystyrene.

15. The polyfunctional epoxy resin (E) according to claim 13, wherein the monohydric phenol compound represented by the formula (1) is a compound of the formula (2),

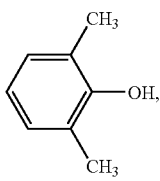

(2)

a compound of the formula (3),

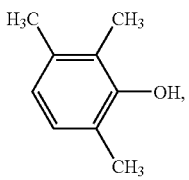

(3)

or a mixture of compounds of the formula (2) and the formula (3).

16. An epoxy resin composition containing the polyfunctional epoxy resin (E) as defined in claim 13.

17. An epoxy curable resin composition containing the polyfunctional epoxy resin (E) as defined in claim 13 and a curing agent.

18. An epoxy cured product obtained by curing the epoxy curable resin composition as defined in claim 17.

19. A polyfunctional phenylene ether oligomer (B) having 3 to less than 9 phenolic hydroxyl groups, which oligomer (B) is obtained by reacting a polyfunctional phenol (A) having 3 to less than 9 phenolic hydroxyl groups per molecule and having two groups which are the same or different and are selected from the group consisting of an alkyl group and an alkylene group at 2- and 6-positions of at least one of the 3 to less than 9 phenolic hydroxyl groups with a monohydric phenol compound represented by the formula (1),

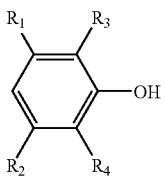

(1)

wherein $R_1$ and $R_2$ are the same or different and represent a hydrogen atom, a halogen atom, an alkyl group having 6 or less carbon atoms or a phenyl group, and $R_3$ and $R_4$ are the same or different and represent a halogen atom, an alkyl group having 6 or less carbon atoms or a phenyl group, and wherein the polyfunctional phenol (A) is at least one compound selected from the group consisting of a compound represented by the formula (4), a compound represented by the formula (5), a compound represented by a compound represented by the formula (7),

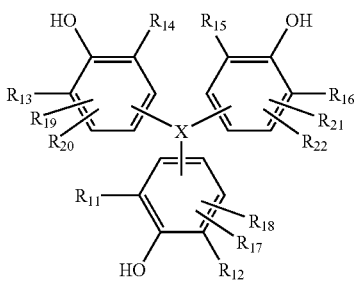

(4)

wherein X is a hydrocarbon having 1 carbon atom, $R_{11}$ and $R_{12}$ are the same or different and represent an alkyl group having 6 or less carbon atoms, $R_{13}$, $R_{14}$, $R_{15}$ and $R_{16}$ are the same or different and represent a hydrogen atom, a halogen atom, an alkoxy group, an alkyl group having 6 or less carbon atoms or a phenyl group. and $R_{17}$, $R_{18}$, $R_{19}$, $R_{20}$, $R_{21}$ and $R_{22}$ are the same or different and represent a hydrogen atom, an alkoxy group, an alkyl group having 6 or less carbon atoms or a phenyl group,

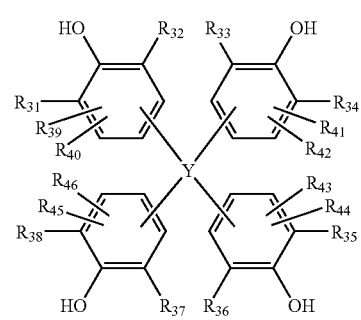

(5)

wherein Y is a hydrocarbon having 1 to 20 carbon atoms, $R_{31}$ and $R_{32}$ are the same or different and represent an alkyl group having 6 or less carbon atoms, $R_{33}$, $R_{36}$, $R_{37}$ and $R_{38}$ are the same or different and represent a hydrogen atom, a halogen atom, an alkoxy group, an alkyl group having 6 or less carbon atoms or a phenyl group, and $R_{39}$, $R_{40}$, $R_{41}$, $R_{42}$, $R_{43}$, $R_{44}$, $R_{45}$ and $R_{46}$ are the same or different and represent a hydrogen atom, an alkoxy group, an alkyl group having 6 or less carbon atoms or a phenyl group,

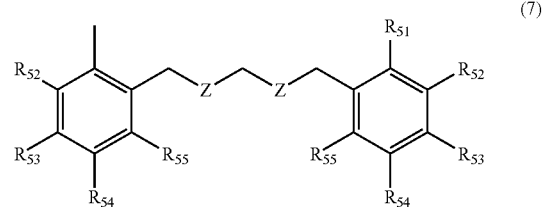

(7)

wherein Z is a phenylene group which has a hydroxyl group at at least one position and may have substituent(s) at other positions, at least one of $R_{51}$, $R_{53}$ and $R_{55}$ represents a hydroxyl group and the others each represent a hydrogen atom, an alkoky group, an alkyl group having 6 or less carbon atoms or a phenyl group, and each of $R_{52}$ and $R_{54}$ represents a hydrogen atom, an alkyl group having 6 or less carbon atoms or a phenyl group, provided that two groups which are the same or different and are selected from the group consisting of an alkyl group and an alkylene group are present at 2- and 6-positions of at least one hydroxyl group in a molecule.

20. The polyfunctional phenylene ether oligomer (B) according to claim 19, wherein the polyfunctional phenylene ether oligomer (B) has a number average molecular weight of 700 to 3,000 as polystyrene.

21. The polyfunctional phenylene ether oligomer (B) according to claim 19, wherein the monohydric phenol compound represented by the formula (1) is a compound of the formula (2),
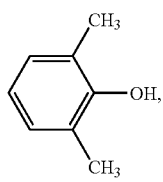
(2)
a compound of the formula (3),
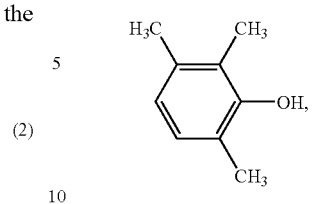
(3)
or a mixture of compounds of the formula (2) and the formula (3).
* * * * *

UNITED STATES PATENT AND TRADEMARK OFFICE
CERTIFICATE OF CORRECTION

PATENT NO. : 7,662,906 B2
APPLICATION NO. : 11/704211
DATED : February 16, 2010
INVENTOR(S) : Kazuyoshi Uera et al.

It is certified that error appears in the above-identified patent and that said Letters Patent is hereby corrected as shown below:

In claim 1, at column 41, line 4, "2-and 6-positions" should be: --2- and 6-positions--.

In claim 1, at column 42, lines 10-23,

"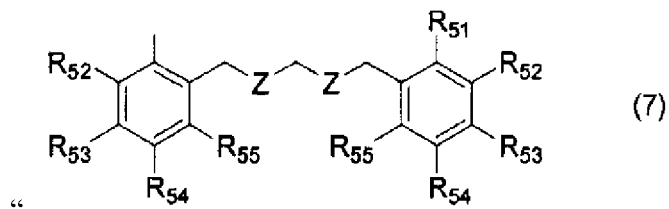

wherein Z is a phenylene group which has a hydroxyl group at least one position" should be:

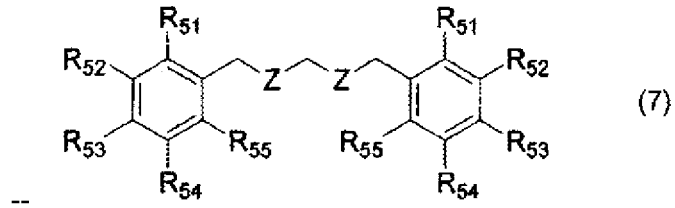

wherein Z is a phenylene group which has a phenolic hydroxyl group at at least one position--.

In claim 13, at column 43, line 45, the word "K" should be: --$R_2$--.

Signed and Sealed this
Tenth Day of July, 2012

David J. Kappos
*Director of the United States Patent and Trademark Office*

CERTIFICATE OF CORRECTION (continued)
U.S. Pat. No. 7,662,906 B2

In claim 13, column 44, lines 37-49,

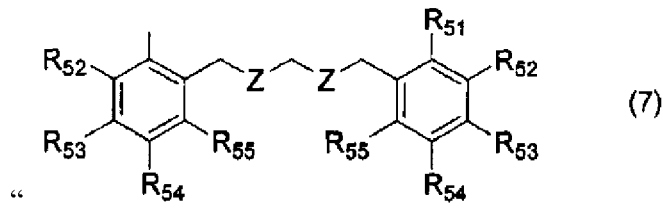

"
wherein Z is a phenylene group which has a hydroxyl group at least one position" should be:

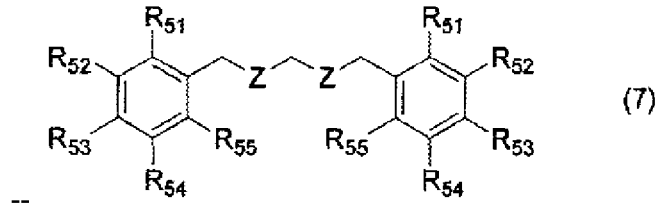

--
wherein Z is a phenylene group which has a phenolic hydroxyl group at at least one position--.

In claim 19, at column 45, lines 54 and 55, "by the formula (5), a compound represented by a compound represented by the formula (7),", should be: --by the formula (5), and a compound represented by the formula (7),--.

In claim 19, at column 46, line 6, "group." should be: --group,--.

In claim 19, at column 46, line 30, "$R_{33}, R_{36}, R_{37}$" should be: --$R_{33}, R_{34}, R_{35}, R_{36}, R_{37}$--.

In claim 19, at column 46, lines 39-51,

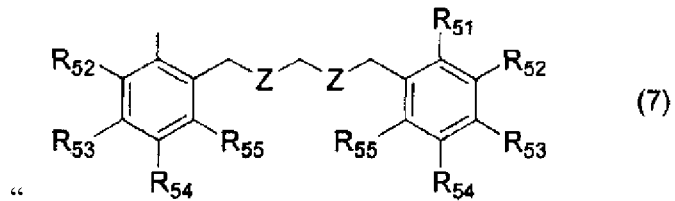

"
wherein Z is a phenylene group which has a hydroxyl" should be:

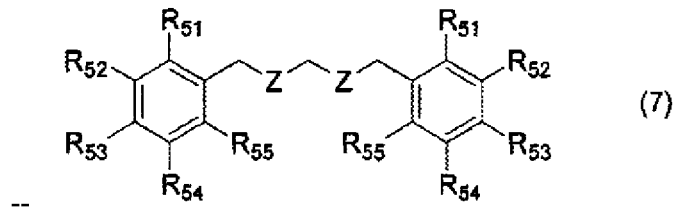

--
wherein Z is a phenylene group which has a phenolic hydroxyl--.